(12) United States Patent
Tobiason et al.

(10) Patent No.: US 6,850,329 B2
(45) Date of Patent: Feb. 1, 2005

(54) INTERFEROMETER USING INTEGRATED IMAGING ARRAY AND HIGH-DENSITY POLARIZER ARRAY

(75) Inventors: Joseph D. Tobiason, Woddinville, WA (US); Kim W. Atherton, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 163 days.

(21) Appl. No.: 10/270,130

(22) Filed: Oct. 15, 2002

(65) Prior Publication Data

US 2004/0070767 A1 Apr. 15, 2004

(51) Int. Cl.[7] ............................................... G01B 9/02
(52) U.S. Cl. ...................................................... 356/495
(58) Field of Search ................................. 356/457, 458, 356/491, 492, 495, 521

(56) References Cited

U.S. PATENT DOCUMENTS

| | | | |
|---|---|---|---|
| 6,018,393 A | * | 1/2000 | Takishima et al. .......... 356/511 |
| 6,108,131 A | | 8/2000 | Hansen et al. |
| 6,122,103 A | | 9/2000 | Perkins et al. |
| 6,243,199 B1 | | 6/2001 | Hansen et al. |
| 6,304,330 B1 | | 10/2001 | Millerd et al. |

FOREIGN PATENT DOCUMENTS

| DE | 19652113 A1 | * 6/1998 | ............. G01J/9/02 |
|---|---|---|---|

* cited by examiner

*Primary Examiner*—Samuel A. Turner
*Assistant Examiner*—Michael A. Lyons
(74) *Attorney, Agent, or Firm*—Oliff & Berridge, PLC

(57) ABSTRACT

An integrated imaging element for an interferometer generates at least one image that includes multiple interference portions with different relative phase shifts interleaved in a pattern having a high spatial frequency in the image. The interleaved pattern is at least partially determined by the pattern of a high density polarizing array used in the integrated imaging element. In various embodiments, the multiple interference portions are interleaved in a checkerboard pattern across the entire surface of a detector device. As a result, various non-common mode errors present in various interferometers that generate separate non-interleaved images for each relative phase are reduced or eliminated because multiple phase-shifted interference image information for a small region of an object is provided within a small region on the detector device.

45 Claims, 12 Drawing Sheets

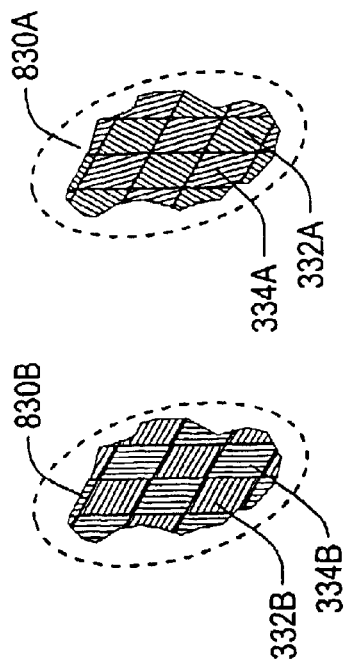
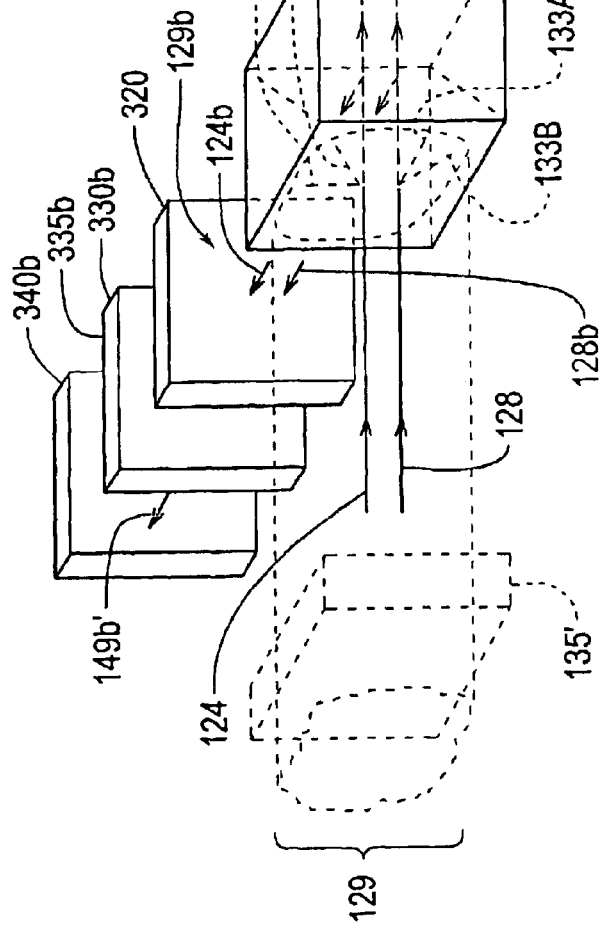
Fig. 8C
Fig. 8B
Fig. 8A

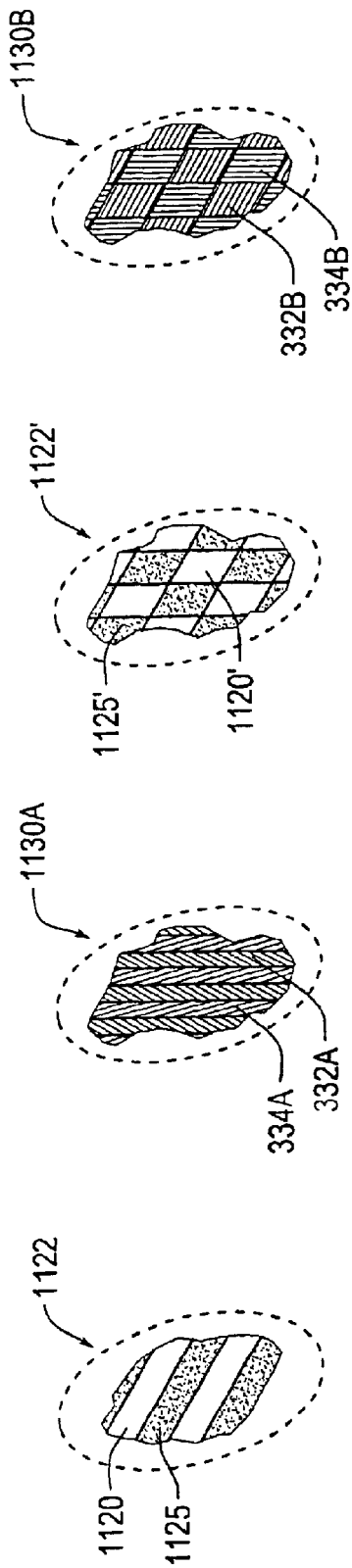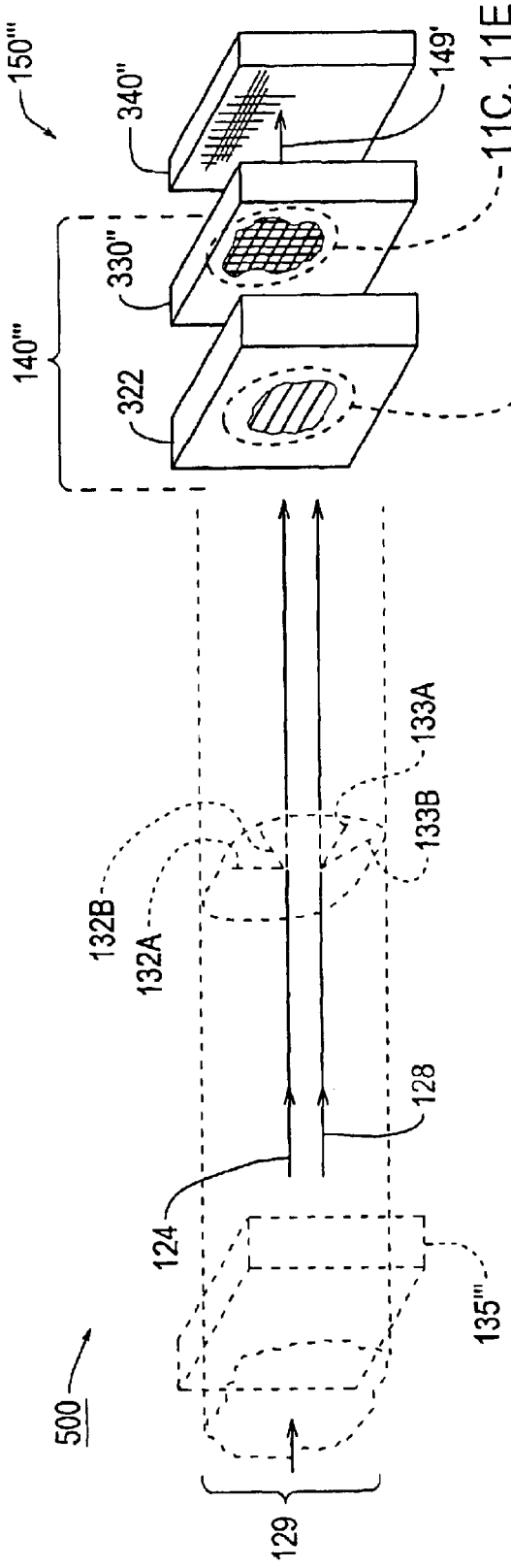

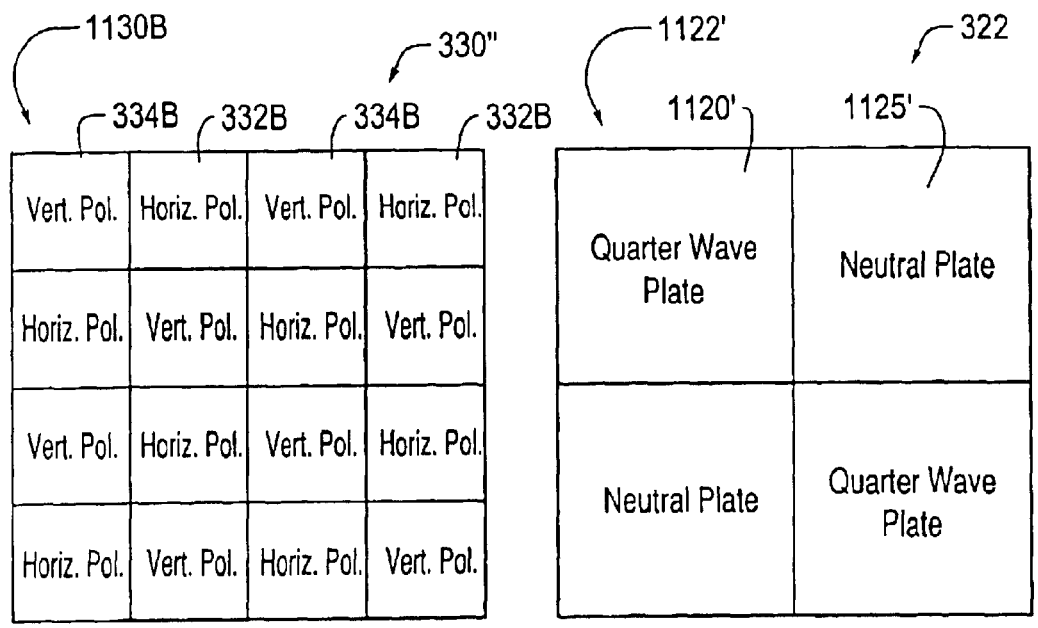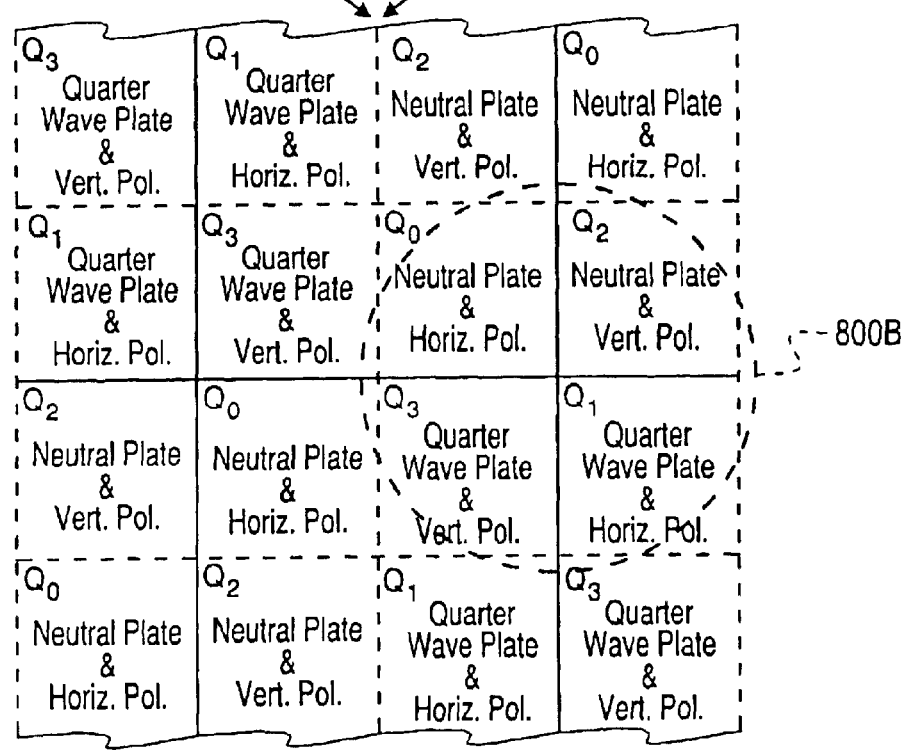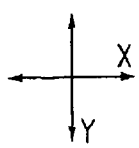
Fig. 13

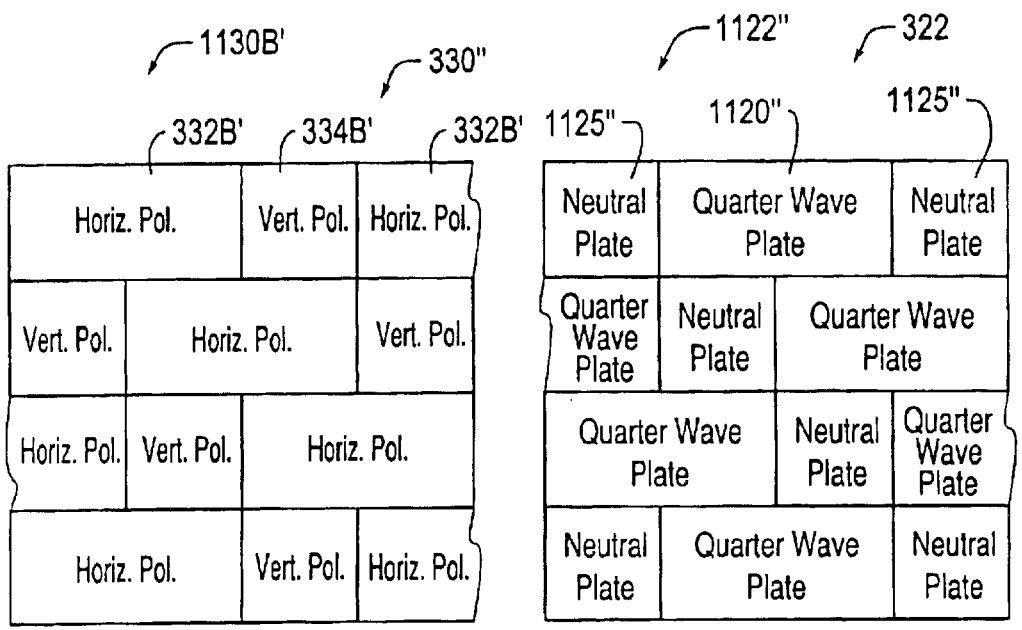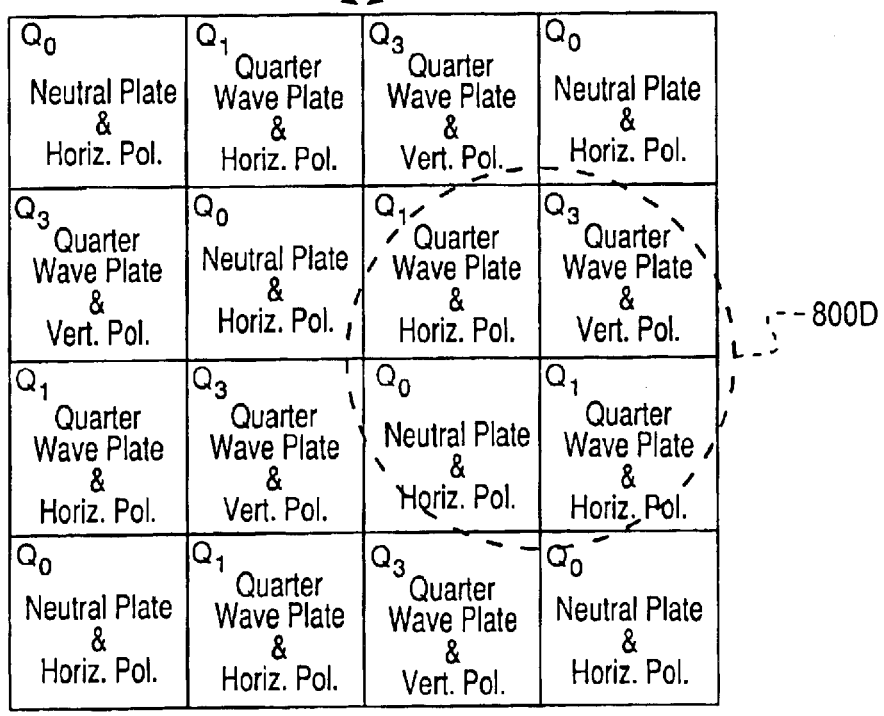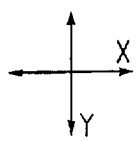
Fig. 15

INTERFEROMETER USING INTEGRATED IMAGING ARRAY AND HIGH-DENSITY POLARIZER ARRAY

BACKGROUND OF THE INVENTION

1. Field of Invention

This invention is directed to an interferometer that includes improved polarizing and phase shifting structures.

2. Description of Related Art

U.S. Pat. No. 6,304,330, which is incorporated herein by reference for all of its relevant teachings, discloses a novel multiple phase-shifting image generating structure that combines a wavefront-spreading element, a phase-shifting interference element and a sensing element. By combining the wavefront-spreading element, the phase-shifting interference element, and the sensing element, the multiple phase-shifting image generating structure shown in the 330 patent is able to convert many sources of potential error in interferometry measurements into common-mode errors. That is, these errors, in view of the multiple phase-shifting image generating structure disclosed in the 330 patent, equally affect all of the interferometry measurements. As a result, the magnitude and direction of these common-mode errors can be ignored when making high-precision measurements using an interferometer that includes the multiple phase-shifting image generating structure disclosed in the 330 patent.

SUMMARY OF THE INVENTION

However, the multiple phase-shifting image generating structure disclosed in the 330 patent introduces new sources of non-common-mode errors that can adversely affect high-precision interferometry measurements. Achieving an error insensitivity similar to that obtained with the particular form of the multiple phase-shifting image generating structure disclosed in the 330 patent while avoiding such new non-common-mode error sources, or converting them into common-mode errors, would be desirable.

This invention provides an imaging element for an interferometer that converts non-common-mode error sources of various multiple phase-shifting image generating structures into common-mode errors.

This invention separately provides an imaging element for an interferometer that is relatively insensitive to path length changes between an upstream optical element and the imaging element.

This invention further provides an imaging element that is less sensitive to path length changes than the multiple phase-shifting image generating element disclosed in the 330 patent.

This invention provides an imaging element that is usable in one or more ways that are relatively insensitive to variations over the sensing element with regard to the relation between input image intensity values and output signal values.

This invention further provides an imaging element that usable in one or more ways that are less sensitive to variations between the input image intensity values and output signal values over the sensing element than the multiple phase-shifting image generating structure disclosed in the 330 patent.

This invention separately provides an imaging element having a high-density polarizing array.

This invention separately provides an imaging element having a high-density polarizing array and a high-density retarder plate array.

This invention separately provides an imaging element for an interferometer that divides an input light beam into a plurality of different portions based on polarization, where the different portions of like-polarization are interleaved across an imaging array on a pixel cell-by-pixel cell basis.

This invention further provides an imaging element where the pixel cells are single pixels in size.

This invention separately provides an imaging element for an interferometer that splits an input light beam into two similar portions, introduces a phase difference between the portions and applies the two portions to different regions of an imaging array, where each of the first two portions is further divided into at least two portions based on polarization differences, where for each of the first two portions, the at least two second portions based on polarization differences are interleaved on a pixel cell-by-pixel cell basis across the corresponding portions of the imaging array.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein;

FIG. 8 is an exploded view of the phase-shift imaging element shown in FIG. 7, including the first exemplary embodiment of the multiple phase-shift generating structure shown in FIG. 7;

FIG. 11 is an exploded view illustrating a third exemplary embodiment of a phase-shift imaging element including a third exemplary embodiment of a multiple phase-shift generating structure according to this invention that incorporates a high-density polarizer array according to this invention combined with a high-density phase-shifting array element according to this invention;

FIG. 13 is a schematic diagram illustrating in greater detail a second exemplary embodiment of the third exemplary embodiment of the multiple phase-shift generating structure shown in FIG. 11 that incorporates a high-density polarizer array according to this invention combined with a high-density phase-shifting array element according to this invention;

FIG. 15 is a schematic diagram illustrating in greater detail a fourth exemplary embodiment of the third exemplary embodiment of the multiple phase-shift generating structure shown in FIG. 11 that incorporates a high-density polarizer array according to this invention combined with a high-density phase-shifting array element according to this invention.

DETAILED DESCRIPTION OF EXEMPLARY EMBODIMENTS

Figure 1:
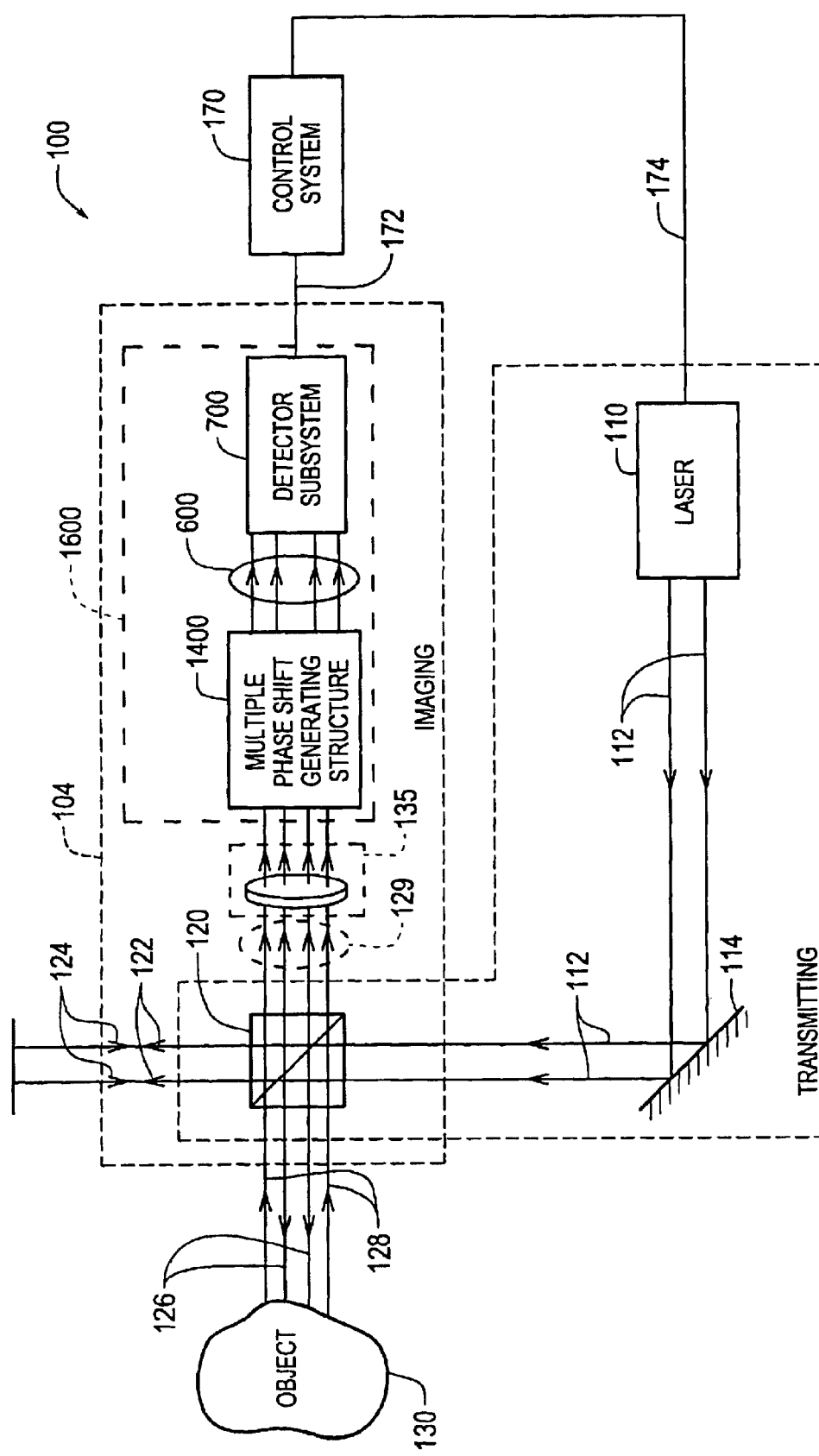
FIG. 1 illustrates one exemplary embodiment of an interferometer apparatus with which the various exemplary embodiments of the phase-shift array imaging element according to this invention are usable.

FIG. 1 shows one exemplary embodiment of an interferometer 100 with which the various exemplary embodiments of the phase-shift imaging element and other optical elements according to this invention are usable. As shown in FIG. 1, the interferometer 100 generally includes a transmitting portion 102 and an imaging portion 104. The transmitting portion 102 includes a laser source 110 that transmits a coherent light wavefront 112. In various exemplary embodiments, the laser source 110 may include two lasers, wavelength modulation, or any other known or later-developed device, structure or apparatus that provides at least two wavelengths of light at different times, for the coherent light wavefront 112. As used herein, the term "light" encompasses not only visible light, but any part of the electromagnetic spectrum that is otherwise usable according to the principles of this invention. When at least two wavelengths of light are provided, the interferometer 100 may provide certain types of absolute measurement. In any case, the coherent light wavefront 112 transmitted by the laser source 110 is redirected by a mirror 114 into a single polarizing wavefront splitter 120. In particular, it should be appreciated that the single polarizing wavefront splitter 120 is shared by both the transmitting portion 102 and the imaging portion 104. That is, the single polarizing wavefront splitter 120 both splits the coherent light wavefront 112 into a reference wavefront 122 and an object wavefront 126, as well as combining the return reference wavefront 124 and the returning object wavefront 128 into a combined wavefront 129. The combined wavefront 129 then passes through an optical input portion 135.

As shown in FIG. 1, the imaging portion 104 of the exemplary embodiment of the interferometer 100 includes, in addition to the single polarizing wavefront splitter 120 and the optical input portion 135, a multiple phase-shift image generating portion 160. In various exemplary embodiments, the optical input portion 135 includes one or more optical elements such as lenses, apertures and the like, such that the combined wavefront 129 transmitted by the optical input portion 135 is compatible with the multiple phase-shift image generating portion 160. As shown in FIG. 1, the multiple phase-shift image generating portion 160 includes a multiple phase-shift generating structure 140 that inputs the combined wavefront 129 from the optical input portion 135 and outputs multiple phase-shifted interference image information 149 to a detector subsystem 150.

The detector subsystem 150 has, in general, an active surface that may be defined by an optical array. The optical array may be a 2-dimensional pixel array and may be a video-imaging sensor, such as a charged coupled device (CCD) camera, or the like. The detector subsystem 150 inputs the multiple phase-shifted interference image information 149 and outputs the image data captured by the detector subsystem 150 over a signal line 172 to a control system 170. The control system 170 performs any desired image processing and/or analyses on the captured image data, including measurement determinations. The control system 170 also outputs a control signal 174 to drive the laser source 110 of the transmitting portion 102.

Figure 2:
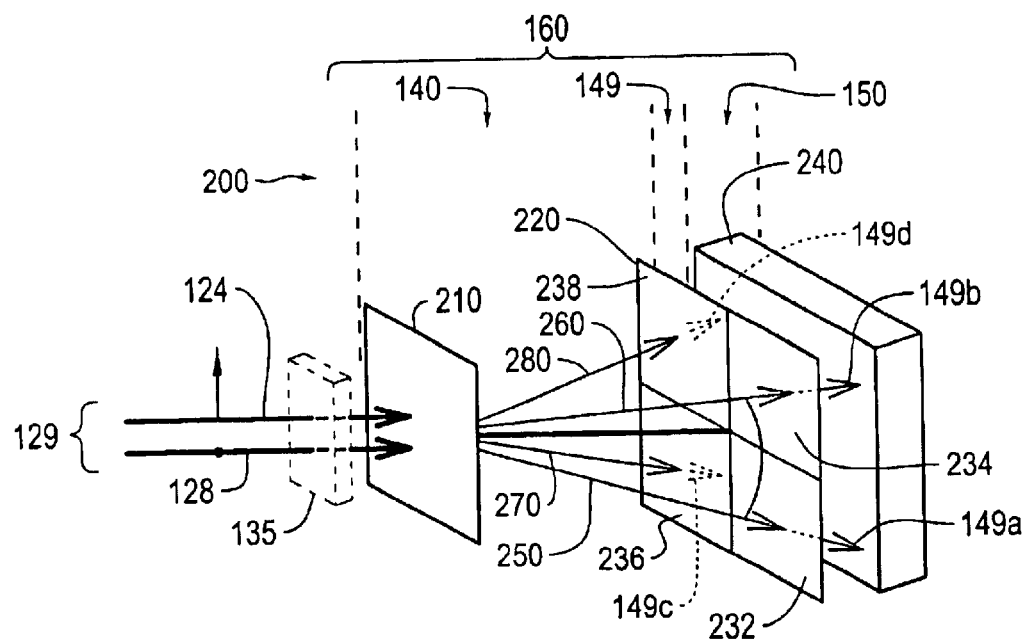
FIG. 2 illustrates the particular form of a multiple phase-shifted image generating apparatus disclosed in the 330 patent.

FIG. 2 schematically shows one exemplary embodiment of a multiple phase-shifted-image generating apparatus 200 disclosed in the 330 patent. The multiple phase-shifted-image generating apparatus 200 includes a wavefront splitting element 210 and a phase-shifting interference element 220 that are usable in combination to provide a known embodiment of the multiple phase-shift generating structure 140 previously described with reference to in FIG. 1. The multiple phase-shifted-image generating apparatus 200 also includes a detector array 240, which similarly provides a known embodiment of the detector subsystem 150.

As shown in FIG. 2, the combined wavefront 129 transmitted by the optical input portion 135 includes the reference wavefront 124 from the transmitting portion 102 and the object wavefront 128 returned or reflected by the object 130 through the polarizing wavefront splitter 120. The polarizing wavefront splitter 120 is configured so that the reference wavefront 124 and the object wavefront 128 are orthogonally polarized, which is indicated in FIG. 2 by the arrow and dot symbol convention applied to the wavefronts 124 and 128.

From the optical input portion 135, the combined wavefront 129 is directed onto the wavefront splitting element 210. As disclosed in the 330 patent, the wavefront splitting element 210 is a two-dimensional diffractive optical element (DOE), and is more particularly a holographic optical element (HOE). In any case, the wavefront splitting element 210 splits the combined wavefront 129 into four spatially-separated and nominally congruent sub-wavefronts 250, 260, 270 and 280, which may, in various embodiments, be transmitted through an output lens (not shown). In particular, as disclosed in the 330 patent, each of the sub-wavefronts 250–280 follows a spatially discrete path. Each of the sub-wavefronts 250–280 is directed from the exemplary wavefront splitting element 210 to an exemplary phase-shifting interference element 220, which includes one section 232, 234, 236 and 238 for each of the sub-wavefronts 250–280, respectively.

In particular, as disclosed in the 330 patent, the phase-shifting interference element 220 is disposed with respect to the wavefront splitting element 210 so that the plurality of sub-wavefronts 250–280 are respectively incident on one of the plurality of sections 232–238. In particular, each of the sections 232–238 of the exemplary phase-shifting interference element 220 everywhere shifts the relative phase between the reference and object wavefronts 124 and 128 of that respective one of the sub-wavefronts 250–280 that is incident on that section 232–238 by a discrete phase shift $\Delta\phi_i$. The sections 232–238 of the exemplary phase-shifting interference element 220 then transmit the resulting wavefronts through respective polarizers to provide one known embodiment of the multiple phase-shifted interference image information 149 previously described with reference to in FIG. 1.

In particular, each of the sections 232–238 of the phase-shifting interference element 220 thus transmits a complete respective one of the spatially-separated phase-shifted interferograms 149a, 149b, 149c and 149d to the detector array 240. The phase shift of each of the spatially-separated phase-shifted interferograms 149a–149d is everywhere the same, and is out of phase with the phase shift of the other phase-shifted interferograms by a factor related to the various discrete phase shifts $\Delta\phi_i$.

As disclosed in the 330 patent, the detector array 240 may be a video-imaging sensor, such as a charged coupled device (CCD) camera. As disclosed in the 330 patent, the detector array 240 is disposed with respect to the phase-shifting interference element 220 so that the spatially-separated plurality of phase-shifted interferograms 149a, 149b, 149c and 149d are substantially simultaneously incident on the active surface of the detector array 240. That is, the active surface of the detector array 240 is able to image the respective spatially-separated phase-shifted interferograms 149a, 149b, 149c and 149d. Based on the imaged spatially-separated phase-shifted interferograms 149a, 149b, 149c and 149d, the spatially resolved phase of each of the spatially-separated phase-shifted interferograms 149a, 149b, 149c and 149d can be measured instantaneously in their different respective regions on the detector array 240.

Figure 3:
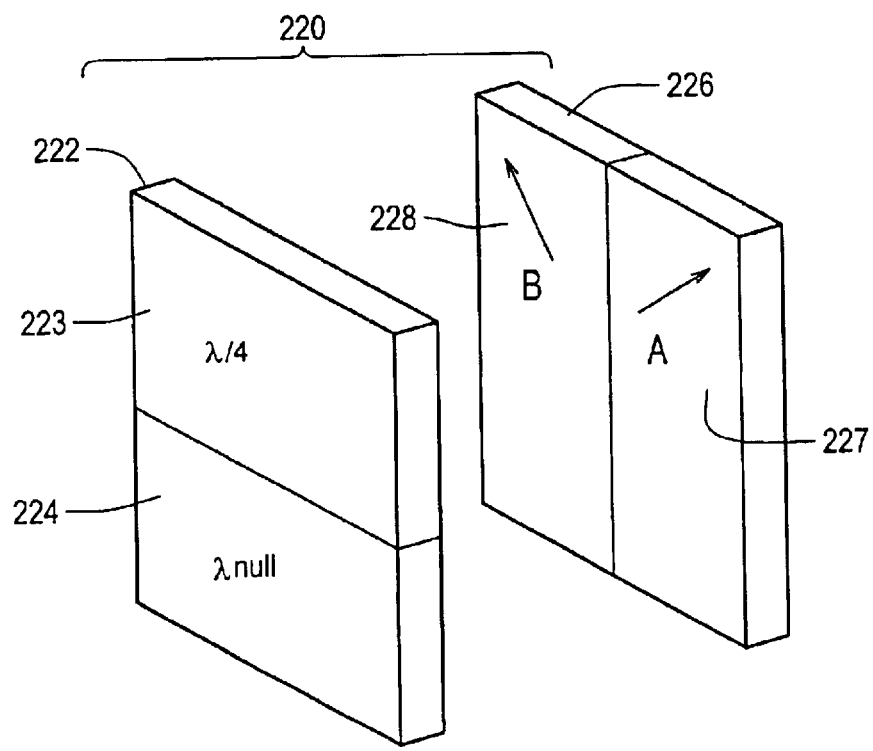
FIG. 3 illustrates in greater detail the phase-shifting element of FIG. 2 of the 330 patent.

FIG. 3 shows one exemplary embodiment of the phase-shifting interference element 220 disclosed in the 330 patent. As shown in FIG. 3, the phase-shifting interference element 220 includes a first plate 222 and a second plate 226. It should be appreciated that, in FIG. 3, the first and second plates 222 and 226 are shown spaced from each other for ease of illustration. However, in operation in the interferometer 100, the first and second plates 222 and 226 would be placed adjacent to each other in an abutting relationship.

As shown in FIG. 3, the first plate 222 includes a quarter-wave plate 223 and a blank or neutral plate 224. In general, a quarter-wave plate shifts the relative phase of two orthogonally-polarized incident wavefronts by 90°. In contrast, the blank or neutral plate shifts the relative phase of two orthogonally-polarized incident wavefronts by 0°. That is, the blank or neutral plate 224 does not create any relative phase shift between the two orthogonally-polarized incident wavefronts. As shown in FIG. 3, the plates 223 and 224 are coplanar and divide the first plate 222 into respective halves.

The second plate 226 of the exemplary phase-shifting interference element 220 includes a pair of polarizing portions 227 and 228 that are configured to polarize an incident wavefront linearly so that electric field vectors of the transmitted wavefront are perpendicular with each other. In particular, in the exemplary embodiment shown in FIG. 3, one of the polarizing portions, such as, for example, the first polarizing portion 227, is configured to transmit polarized light at +45° with respect to the vertical axis, as illustrated by arrow A in FIG. 3. As a result, this causes the in-phase components arising from the reference and object wavefronts 124 and 128 to interfere.

Similarly, the other polarizing portion, such as, for example, the second polarizing portion 228, is configured to polarize light at −45° with respect to the vertical axis, as shown by arrow B. As a result, the out-of-phase components arising from the reference and object wavefronts 124 and 128 interfere. Like the quarter-wave and blank or neutral plates 223 and 224, the first and second polarizing portions 227 and 228 of the second plate 226 are also generally coplanar and divide the second plate 226 into respective halves.

Accordingly, it should be appreciated that, according to the structure shown in FIG. 3, the first portion 232 of the exemplary phase-shifting interference element 220 corresponds to the portion of the exemplary phase-shifting interference element 220 where the neutral plate 224 overlaps with the first (+45°) polarizing portion 227. Similarly, the second portion 234 corresponds to the quarter-wave plate 223 overlapping the first (+45°) polarizing portion 227. In contrast, the third portion 236 corresponds to the neutral plate 224 overlapping the second (−45°) polarizing portion 228, while the fourth portion 238 corresponds to the quarter-wave plate 223 overlapping the second (−45°) polarizing portion 228.

In particular, in the exemplary embodiment shown in FIG. 3, the first and second plates 222 and 226 are configured so that the respective portions 223 and 224 of the first plate 222 are perpendicular to the first and second polarizing portions 227 and 228 of the second plate 226.

Figure 4:
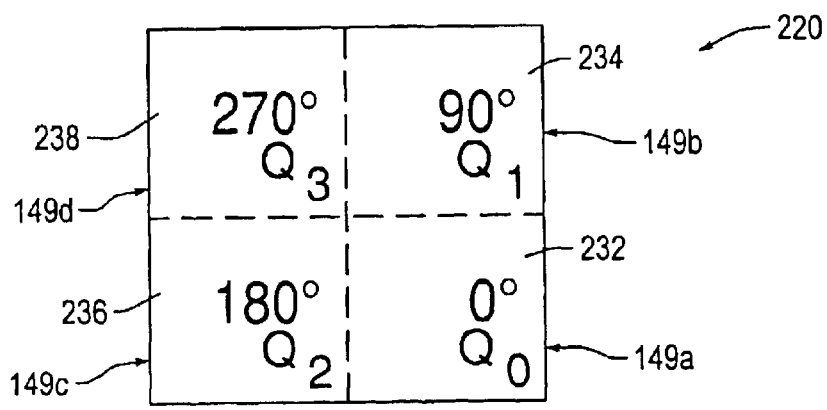
FIG. 4 illustrates the relative phase shift between the four portions of light generated using the multiple phase-shifted image generating structure disclosed in the 330 patent.

As a result, in the exemplary embodiment of the phase-shifting interference element 220 shown in FIG. 3, and as represented in FIG. 4, in the first portion 232, the neutral plate 224 and the first (+45°) polarizing portion 227 interfere the in-phase component, that is, the 0° component between the reference and object wavefronts 124 and 128 incident on the phase-shifting interference element 220, to generate the interferogram 149a. In contrast, in the second portion 234, the quarter-wave plate 223 and the first (+45°) polarizing portion 227 combine to interfere the in-phase quadrature component, that is, the 90° component, between the incident reference and object wavefronts 124 and 128, to generate the interferogram 149b. In contrast to both the first and second portions 232 and 234, for the third portion 236, the neutral plate 224 and the second (−45°) polarizing portion 228 combine to interfere the out-of-phase component, that is, the 180° component, between the incident reference and object wavefronts 124 and 128, to generate the interferogram 149c. Finally, for the fourth portion 238, the quarter-wave plate 223 and the second (−45°) polarizing portion 228 combine to interfere the out-of-phase quadrature component, i.e., the 270° component, between the reference and object wavefronts 124 and 128, to generate the interferogram 149d.

As disclosed in the 330 patent, it is desirable to maximize the imaging area of the detector array 240. Thus, to maximize the imaging area of the detector array 240, the portion of the surface area of the detector array 240 that is illuminated with the spatially-separated interferograms 149a, 149b, 149c, and 149d should be maximized. Thus, in the multiple phase-shifted image generating apparatus 200 disclosed in the 330 patent, to maximize the imaging area of the detector array 240, the phase-shifting interference element 220 is desirably placed adjacent to or substantially at the active surface of the detector array 240. By detecting the plurality of spatially-separated phase-shifted interferograms 149a, 149b, 149c and 149d substantially instantaneously using the detector array 240, the control system 170 is able to instantaneously measure the entire test object 130. Additionally, by instantaneously detecting all of the spatially-separated phase-shifted interferograms 149a, 149b, 149c and 149d, there is no need to individually scan any of the incident object wavefronts 126 spatially through or across the surface of the object 130.

Figure 5:
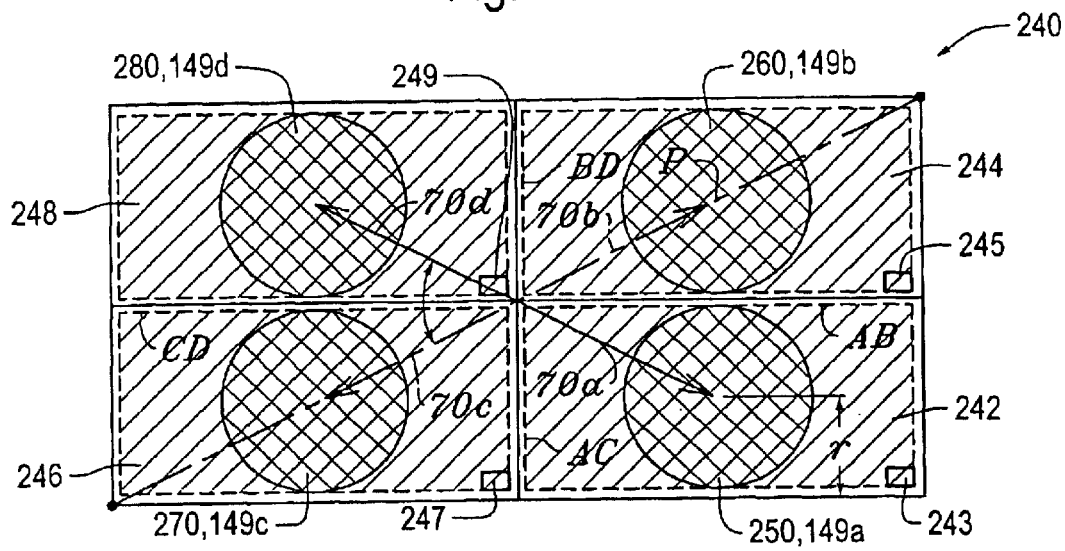
FIG. 5 illustrates how the four portions of light are distributed over an imaging array when using the multiple phase-shifted image generating structure disclosed in the 330 patent.

As shown in FIG. 5, the imaged sub-wavefronts 250, 260, 270 and 280 are spatially separated from each other across the surface of the detector array 240. However, one or more of the optical input portion 135, the wavefront splitting element 210, and/or the output lens (if present) are configured so that each of the imaged sub-wavefronts 250, 260, 270 and 280, that is, each of the phase-shifted interferograms 149a–149d incident at the surface of the detector array 240 is adjacent to, or substantially contiguous with, at least one other sub-wavefront, as also shown in FIG. 5. For example, as shown in FIG. 5, the sub-wavefront 250 is substantially contiguous with the sub-wavefronts 260 and 270, while the sub-wavefront 260 is substantially contiguous with the sub-wavefronts 250 and 280, the sub-wavefront 270 is substantially contiguous with the sub-wavefronts 250 and 280, and the sub-wavefront 280 is substantially contiguous with the sub-wavefronts 270 and 260.

Additionally, as shown in FIG. 5, the radial angular displacement β produced by the exemplary wavefront splitting element 210 is configured so that the radial angular displacement β becomes 90° and all four images are radially symmetric. As such, each of the sub-wavefronts 250, 260, 270 and 280 follows an independent optical path from the wavefront splitting element 210 to the surface of the detector array 240. Ideally, each of these independent optical paths has a length that is substantially equal to each of the other optical paths. Accordingly, the plurality of sub-wavefronts 250, 260, 270 and 280 reach the surface of the detector array 240 substantially simultaneously.

As shown in FIG. 5, the detector array 240 can be considered to have distinct portions 242, 244, 246 and 248 in which each of the sub-wavefronts 250, 260, 270 and 280, respectively, are nominally congruently imaged, as the phase-shifted interferograms 149a, 149b, 149c and 149d. In particular, as shown in FIG. 5, when the wavefront splitting element 210 and the phase-shifting interference element 220 disclosed in the 330 patent are used as the multiple phase-shift generating structure 140, each of the portions 242–248 is spaced apart from each other within the detector array 240.

Accordingly, in the resulting known embodiment of the multiple phase-shifted interference image information 149 disclosed in the 330 patent, when comparing pixels in order to determine a measurement value for the object 130, widely-separated pixels in each of the portions 242–248 of the detector array 240 must be compared. For example, for a given pixel 243 in the first portion 242, correspondingly located pixels 245, 247 and/or 249 in the second-fourth portions 244–248, respectively, must be compared.

As outlined above, the known wavefront splitting element 210, in combination with the known phase-shifting interference element 220, converts a number of errors in other interferometers that are not common-mode errors into common-mode errors when used in the interferometer 100, as shown in FIGS. 1 and 2. However, as shown in FIG. 2, the wavefront-splitting element 210 must be spaced away from the phase-shifting interference element 220 a distance sufficient to get the appropriate divergence and spacing between each of the sub-wavefronts 250, 260, 270 and 280. Additionally, as recognized in the 330 patent, each of the path lengths of the paths of the sub-wavefronts 250, 260, 270 and 280 from the wavefront-splitting element 210 to the phase-shifting interference element 220 should ideally be the same.

However, the requirement that these path lengths ideally be the same introduces a new source of error. That is, any rotations and/or translations that do not affect the paths of the sub-wavefronts 250, 260, 270 and 280 equally will cause the path lengths of these paths to vary. In general, this will cause different focus conditions in the associated spatially-separated phase-shifted interferograms 149a, 149b, 149c and 149d, and/or may cause a shift in the relative locations of the various portions spatially-separated phase-shifted interferograms 149a, 149b, 149c and 149d upon the detector, which can lead to errors. For example, for the given pixel 243 in the first portion 242, as discussed above with respect to FIG. 5, the correspondingly located pixels 245, 247 and/or 249 in the second-fourth portions 244–248, respectively, may no longer correspond to precisely the same portion of the object 130 and, thus, may no longer be properly comparable. This in turn introduces a source of error into the measurement values generated by the control system 170 from the image data output over the signal line 172 from the detector array 240.

Similarly, because the associated spatially-separated phase-shifted interferograms 149a, 149b, 149c and 149d of the sub-wavefronts 250, 260, 270 and 280 are spaced apart from each other over the surface of the detector array 240, any variations in the output signal amplitude for a given intensity value generated by one of the subportions 242, 244, 246 and 248 to that output by one of the other subportions 242, 244, 246 or 248 will introduce a source of error.

As is well known in the art, for semiconductor imaging devices, such as CCD arrays and C-MOS-based arrays, any two adjacent pixels will likely have the same response curve or transfer function between an input intensity and an output signal amplitude. However, as is well-known in the art, for such semiconductor imaging, pixels significantly spaced apart within the array, such as the pixels 243, 245, 247, and 249, can have significantly different response curves or transfer functions between the input intensity and output signal amplitude.

Accordingly, this introduces another error into the measurements generated by the control system 170 from the image data generated by the detector array 240. In addition, it is difficult and/or expensive to make the multiple phase-shifted-image generating apparatus 200, including the wavefront-splitting element 210 that provides the functions described with reference to FIGS. 2–5, without introducing various aberrations that vary between the comparable regions of the spatially-separated phase-shifted interferograms 149a, 149b, 149c and 149d.

It should be appreciated that the various errors and difficulties described above with reference to the elements and operations shown in FIGS. 2–5 exemplify similar errors and difficulties that may arise in any system to the extent that the multiple phase-shift generating structure 140 and the multiple phase-shifted interference image information 149 distribute spatially-separated wavefronts, that is, spatially-separated phase-shifted interferograms, into separate portions or surfaces of the detector subsystem 150.

The inventors, in addition to recognizing these new sources of non-common-mode errors, have determined that these and other errors can be reduced, and ideally eliminated, to the extent that multiple phase-shifted interference image information can be provided for multiple phases within a small region on the detector subsystem 150. This is in contrast to distributing each of the sub-wavefronts 250, 260, 270 and 280, and thus the respective distinct spatially-separated phase-shifted interferograms 149*a*, 149*b*, 149*c* and 149*d* into separate portions of the detector array 240, which embodies the detector subsystem 150, over independent optical paths.

Stated another way, the inventors have determined that, if the number of spatially-separated sub-wavefronts, such as the sub-wavefronts 250, 260, 270 and 280 disclosed in the 330 patent, and their respective spatially-separated phase-shifted interferograms in the multiple phase-shifted interference image information 149, can be reduced relative to the number of phases included in the multiple phase-shifted interference image information 149, then at least some errors related to these non-common-mode error sources can either be eliminated and/or converted into common-mode errors. In either case, this tends to reduce the amount of error in related measurements.

For example, if the multiple phase-shifted interference image information produced by the combination of the spatially-separated phase-shifted interferograms 149*a*, 149*b*, 149*c* and 149*d* can be retained, while modifying or eliminating the wavefront splitting element 210, such that at least some of the optical paths for at least some of the phases included in the multiple phase-shifted interference image information were no longer spaced apart over the quadrants $Q_0$–$Q_3$ and the surface of the detector subsystem 150, these non-common-mode error sources can either be eliminated and/or converted into common-mode errors. In either case, this tends to reduce the amount of error, or ideally would not create errors, in the measurements generated by the control system 170 from the images output by the detector subsystem 150 over the signal line 172.

Figure 6:
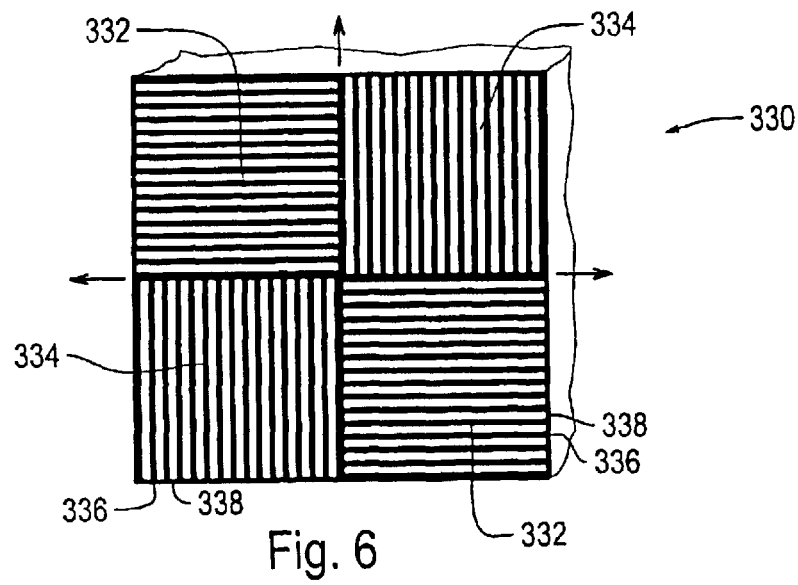
FIG. 6 illustrates a portion of one exemplary embodiment of a high-density polarizer array according to this invention.

FIG. 6 illustrates a portion of one exemplary embodiment of a high-density polarizer array 330 according to this invention. The high-density polarizer array 330 is usable in various exemplary embodiments of the multiple phase-shift generating structure 140, as described below with respect to the first and second exemplary embodiments 300 and 400 of a phase-shift imaging element according to this invention. It should be appreciated that the exemplary embodiments 300 and 400, and similar phase-shift imaging elements according to this invention, are usable in place of the multiple phase-shift image generating apparatus 200 shown in FIGS. 2–5 and, more generally, as the multiple phase-shift image generating portion 160 described with reference to FIG. 1.

As shown in FIG. 6, the high-density polarizer array 330 includes alternating first polarization portions 332 and second polarization portions 334. In particular, as shown in FIG. 6, the first and second polarization portions 332 and 334 alternate in both the horizontal and vertical directions of the high-density polarizer array 330. This creates a checkerboard placement of the first and second polarization portions 332 and 334. In various exemplary embodiments, when the high-density polarizer array 330 is incorporated into various embodiments of the phase-shift imaging elements 300 and 400 according to this invention, the checkerboard pattern of first and second polarization portions 332 and 334 extends substantially over the entire surface area of each portion of a detector device 340 used to implement the detector subsystem 150.

The first polarization portions 332 and second polarization portions 334 of the high-density polarizer array 330 may be formed by any known or later-developed method of fabrication. In particular, the only manufacturing requirement is that the first polarization portions 332 and second polarization portions 334 be fabricated in relatively high density arrays. Specifically, the dimensions of the first polarization portions 332 and second polarization portions 334 must be able to approach the dimensions of one pixel, or a small group of pixels, of an optical detector array, as described further below. In various exemplary embodiments according to this invention, as shown in FIG. 6, each of the first and second polarization portions 332 and 334 is implemented using a wire grid polarizing element formed by an array of parallel conductive elements 336 separated by spaces 338. U.S. Pat. Nos. 6,108,131, 6,122,103 and 6,243,199, each incorporated herein by reference for its relevant teachings, disclose systems and methods for forming such wire grid polarizing elements.

It should be appreciated that, as shown in FIG. 6, the first and second polarization portions 332 and 334, respectively, transmit horizontally and vertically polarized components of an incident light wavefront. However, more generally, it should be appreciated that the polarization directions of the first and second polarization portions 332 and 334 are arbitrarily selectable in combination with the complementary elements of a multiple phase-shift generating structure according to this invention. However, in various exemplary embodiments, the polarization directions for the first and second polarization portions 332 and 334 will be rotated by 45 degrees relative to the two orthogonally polarized incident wavefronts 124 and 128 comprising the combined wavefront 129, and will be mutually orthogonal, to obtain the best relevant contrast in the resulting images. Thus, in various exemplary embodiments, when the two orthogonally polarized incident wavefronts 124 and 128 are oriented as shown in FIG. 2, the parallel conductive elements 336 and spaces 338 in the first polarization portions 332 will be oriented along a 45 degree angle that is similar to the polarization direction A shown in FIG. 3. Likewise, when the two orthogonally polarized incident wavefronts 124 and 128 are oriented as shown in FIG. 2, the parallel conductive elements 336 and spaces 338 in the second polarization portions 334 will be oriented along an orthogonal angle that is similar to the polarization direction B shown in FIG. 3.

It should also be appreciated that, in the exemplary embodiment shown in FIG. 6, the replication directions of the first and second polarization portions 332 and 334 are arranged horizontally and vertically. However, more generally, the replication directions of each of the first and second polarization portions 332 and 334 are completely controllable and selectable in combination with the complementary elements of a multiple phase-shift generating structure according to this invention. In various exemplary embodiments, the first and second polarization portions 332 and 334 will be of equal size and shape and will cover equal areas of the detector device 340.

In general, each of the first or second polarization portions 332 and 334 will extend over an integer number of pixels of the detector device 340. In general, the boundaries of the first and second polarization portions 332 and 334 will be aligned with the boundaries between the pixels of the detector device 340. Thus, each pair or set of the first and second polarization portions 332 and 334 define unit cells within the high-density polarizer array 330 and the detector array 340. At one extreme, each of the respective first and second polarization portions 332 and 334 can be associated with and aligned with a respective single pixel of the detector device 340.

Figure 7:
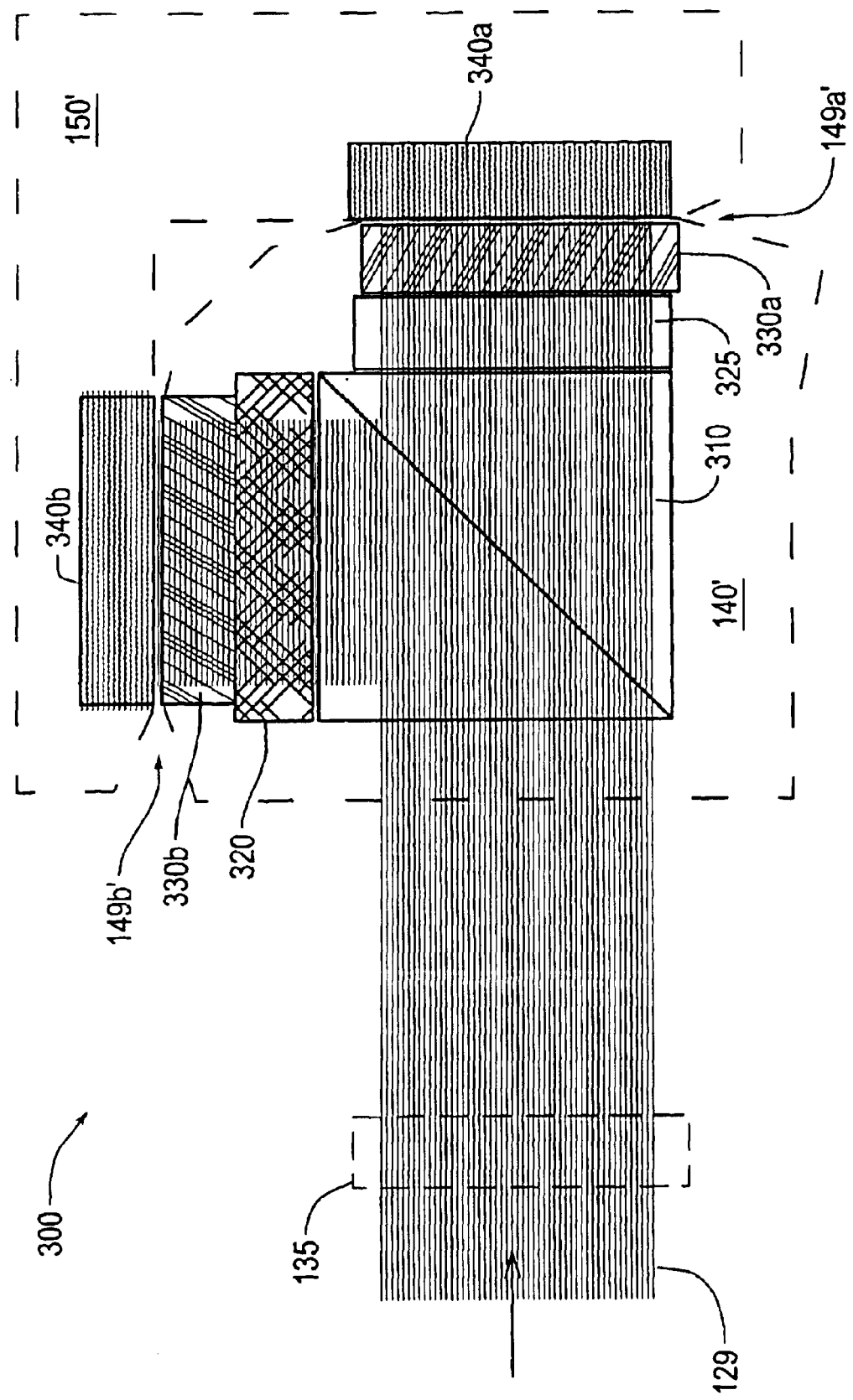
FIG. 7 is a plan view that illustrates a first exemplary phase-shift imaging element including a first exemplary embodiment of a multiple phase-shift generating structure incorporating a high-density polarizer array according to this invention.

FIGS. 7 and 8 illustrate one exemplary phase-shift imaging element 300 according to this invention. As shown in FIG. 7, the phase-shift imaging element 300 includes a first exemplary embodiment of a multiple phase-shift generating structure 140' according to this invention and a detector subsystem 150', which includes detector devices 340a and 340b. The multiple phase-shift generating structure 140' incorporates a high-density polarizer array 330 according to this invention. The multiple phase-shift generating structure 140' also includes a beam splitter 310. A blank or neutral plate 325 and a first high-density polarizer array 330a are adjacent to the beam splitter 310 along a first direction. Along this first direction, the multiple phase-shift generating structure 140' generates multiple phase-shifted interference image information 149a' at its interface with the detector device 340a. A quarter-wave plate 320 and a second high-density polarizer array 330b are adjacent to the beam splitter 310 along a second direction. Along this second direction, the multiple phase-shift generating structure 140' generates multiple phase-shifted interference image information 149b' at its interface with the detector device 340b.

As shown in FIG. 8, the combined wavefront 129 is transmitted by the optical input portion 135'. Various design considerations related to the optical input portion 135' are discussed further below with reference to FIGS. 12–15. The transmitted combined wavefront 129 includes the reference wavefront 124 and the object wavefront 128. The transmitted combined wavefront 129 passes through the beam splitter 310, which splits the combined wavefront 129 into two respective combined sub-wavefronts or "copies" 129a and 129b. It should be appreciated that, due to the action of the beam splitter 310, the sub-wavefronts or "copies" 129a and 129b are mirror images of each other. However, with appropriate signal processing, this difference is inconsequential. Moreover, in various exemplary embodiments, this difference can even be advantageous. The sub-wavefront 129a is directed to the neutral plate 325 and the high-density polarizer array 330a along one direction. In contrast, the sub-wavefront 129b is directed to the quarter-wave plate 320 and the high-density polarizer array 330b along the other direction.

The quarter-wave plate 320 and the neutral or blank plate 325 operate similarly to the quarter-wave plate 223 and the blank or neutral plate 224 of the first portion 222 of the phase-shifting interference element 220 shown in FIGS. 2–4. However, in contrast to the phase-shifted-image generating apparatus 200 disclosed in the 330 patent and described with reference to FIGS. 2–5, in the exemplary phase shift imaging element 300 according to this invention, the quarter-wave plate 320 is filled with a single sub-wavefront and the neutral or blank plate 325 is similarly filled with a single sub-wavefront.

Like the quarter-wave plate 223, the quarter-wave plate 320 shifts the relative phase between the two orthogonally polarized sub-wavefront components 124b and 128b comprising the combined sub-wavefront 129b by 90° to produce a phase-shifted combined sub-wavefront. Similarly, like the blank or neutral wave plate 224, the blank or neutral plate 325 matches the optical path length of the quarter-wave plate 320, but does not shift the relative phase between the two orthogonally polarized incident sub-wavefront components 124a and 128a comprising the combined sub-wavefront 129a.

The combined sub-wavefront 129a passing out of the blank or neutral plate 325 is then directed onto the high-density polarizer array 330a. The high-density polarizer array 330a transmits the orthogonally polarized sub-wavefront components 124a and 128a of the combined sub-wavefront 129a differently in the first polarizing portions 332 and the second polarizing portions 334. As a result, the multiple phase-shifted interference image information 149a' includes a checkerboard pattern of first interference portions and second interference portions interleaved at a high spatial frequency corresponding to the checkerboard pattern of the first polarizing portions 332 and the second polarizing portions 334.

In various exemplary embodiments, the polarizing elements of the first polarizing portions 332 and the second polarizing portions 334, such as the parallel conductive elements 336 separated by spaces 338, as shown in FIG. 6, or polarizing films, or the like, are provided on the surface 335a of the high-density polarizer array 330a that is nearest to the surface of the detector device 340a, as shown by the exploded view shown in FIG. 8. Similarly, the polarizing elements of the first polarizing portions 332 and the second polarizing portions 334, are provided on the surface 335b of the high-density polarizer array 330b that is nearest to the surface of the detector device 340b.

It should be appreciated that, in various other exemplary embodiments, the high-density polarizer array 330a may be fabricated directly on the surface of the blank or neutral plate 325 that is closest to the detector device 340a. Similarly, in various exemplary embodiments, the high-density polarizer array 330b may be fabricated directly on the surface of the quarter-wave plate 320 that is closest to the detector device 340b. Thus, it should be appreciated that, in various exemplary embodiments, the structures and/or functions of the high-density polarizer arrays 330a and/or 330b may be merged with and/or indistinguishable from the corresponding the quarter-wave plate 320 and/or the blank or neutral plate 325. In particular, in various exemplary embodiments the structure and function of the blank or neutral plate 325 may be provided by a substrate of the high-density polarizer array 330a.

It should be appreciated that, in various other exemplary embodiments, the high-density polarizer arrays 330a and/or 330b may be fabricated directly on the surface of the detector devices 340a and 340b, respectively. When the high-density polarizer 330a or 330b is a wire-grid polarizer, a thin insulating layer should be used between the active portions of the detector device 340a or 340b and the elements of the wire-grid polarizer. Thus, it should be appreciated that, in various exemplary embodiments, the structure and function of the high-density polarizer arrays 330a and/or 330b and the detector devices 340a and/or 340b, respectively, may be merged.

In various exemplary embodiments, the polarizing elements of the high-density polarizer arrays 330a and 330b are separated from the surface of the detector elements of the detector devices 340a and 340b, respectively, by only a thin film insulating layer or a negligible air gap, or the like. In such "abutting" embodiments, the best alignment between the first and second polarizing portions 332 and 334 and the detector elements of the detector devices 340a and 340b is facilitated, and "leakage" of interference light of different relative phases between adjacent detector elements or pixels is reduced, and, ideally, minimized. Furthermore, when the polarizing elements of the first polarizing portions 332 and the second polarizing portions 334 are wire grid polarizing elements, any diffraction effects associated with each element will be confined to, and averaged by, the abutting pixel(s), and thus will not disturb the acquired multiple phase-shifted interference image information 149a' and/or 149b'.

In a first exemplary embodiment of the phase-shift imaging element 300, the reference wavefront 124 and the object wavefront 128 are polarized along the orthogonal directions 132A and 133A shown in FIG. 8. In this exemplary embodiment, the high-density polarizer arrays 330a and 330b include a pattern 830A, which includes the first polarizing portions 332A and the second polarizing portions 334A, having respective polarization directions as indicated by the respective "grid lines" in the detailed view of the pattern 830A. In such a case, it should be appreciated that the first polarization portions 332A and the second polarization portions 334A function similarly to the first polarizing portions 227 and the second polarization portions 228, respectively, as described above with reference to FIG. 3. As a result, the high-density polarizer array 330a transmits the multiple phase-shifted interference image information 149a'. Similarly, the high-density polarizer array 330b transmits the multiple phase-shifted interference image information 149b'.

In particular, the multiple phase-shifted interference image information 149a' includes a checkerboard pattern of "$Q_0$" and "$Q_2$" interference portions. The "$Q_0$" interference portions corresponding to a relative phase shift of zero degrees between the sub-wavefront components 124a and 128a that pass through the blank or neutral plate 325 and the first polarization portions 332A of the high-density polarizer array 330a. The "$Q_2$" interference portions corresponding to a relative phase shift of 180 degrees between the sub-wavefront components 124a and 128a that pass through the blank or neutral plate 325 and the second polarization portions 334A of the high-density polarizer array 330a.

In the first exemplary embodiment, the $Q_0$ and $Q_2$ interference portions correspond to the pattern 830A of the first polarizing portions 332A and the second polarizing portions 334A, respectively, of the high-density polarizer array 330a. Thus, the $Q_0$ and $Q_2$ interference portions within the multiple phase-shifted interference image information 149a' are interleaved in a checkerboard pattern at a high spatial frequency corresponding to the pattern 830A. It should be appreciated that this checkerboard pattern of $Q_0$ and $Q_2$ interference portions corresponds to a high-density interleaving of the $Q_0$ quadrant 232 and the $Q_2$ quadrant 236 shown in FIG. 4, transmitted as a single image onto the surface of the detector device 340a.

Similarly to the $Q_0$ and $Q_2$ interference portions of the multiple phase-shifted interference image information 149a', the multiple phase-shifted interference image information 149b' includes a checkerboard pattern of "$Q_1$" and "$Q_3$" interference portions. The $Q_1$ interference portions correspond to a relative phase shift of 90 degrees between the phase-shifted sub-wavefront components 124b and 128b that pass through the quarter-wave plate 320 and the first polarization portions 332A of the high-density polarizer array 330b. In contrast, the $Q_3$ interference portions correspond to a relative phase shift of 270 degrees between the phase-shifted sub-wavefront components 124a and 128a that pass through the quarter-wave plate 320 and the second polarization portions 334A of the high-density polarizer array 330b.

It should be appreciated that, because the sub-wavefronts or "copies" 129a and 129b are mirror images of each other, as described above, the multiple phase-shifted interference image information 149a' and the multiple phase-shifted interference image information 149b' are, likewise, mirror images of each other with respect to their information content with respect to the object 130. However, with appropriate signal processing, this difference is inconsequential or, in various embodiments, even advantageous.

In the first exemplary embodiment, the $Q_1$ and $Q_3$ interference portions correspond to the pattern 830A of the first polarizing portions 332A and the second polarizing portions 334A, respectively, of the high-density polarizer array 330b. Thus, the $Q_1$ and $Q_3$ interference portions within the multiple phase-shifted interference image information 149b' are interleaved in a checkerboard pattern at a high spatial frequency corresponding to the pattern 830A. It should be appreciated that this checkerboard pattern of $Q_1$ and $Q_3$ interference portions corresponds to a high-density interleaving of the $Q_1$ quadrant 234 and the $Q_3$ quadrant 238 shown in FIG. 4, transmitted as a single image onto the surface of the detector device 340b.

In a second exemplary embodiment of the phase-shift imaging element 300, the reference wavefront 124 and the object wavefront 128 are polarized along the orthogonal directions 132B and 133B shown in FIG. 8. In this second exemplary embodiment, the high-density polarizer arrays 330a and 330b include the first polarizing portions 332B and the second polarizing portions 334B include a pattern 830B, which includes the first polarizing portions 332B and the second polarizing portions 334B, having respective polarization directions as indicated by the respective "grid lines" in the detailed view of the pattern 830". In such a case, it should be appreciated that all of the interacting polarization directions for each respective element of this second exemplary embodiment are rotated by the same 45 degree angle compared to their counterpart elements in the first exemplary embodiment of the phase-shift imaging element 300 described above.

Thus, it should be appreciated that, in various exemplary embodiments, this second exemplary embodiment operates in substantially the same manner as the first exemplary embodiment of the phase-shift imaging element 300 described above. As a result, in various exemplary embodiments, the multiple phase-shifted interference image information 149a' and the multiple phase-shifted interference image information 149b' provided by this second exemplary embodiment of the of the phase-shift imaging element 300 include the same checkerboard patterns described above with respect to the first exemplary embodiment of the phase-shift imaging element 300.

It should be appreciated that, as shown in FIG. 7, because the first exemplary embodiment of the multiple phase shift generating structure 140' and the exemplary phase shift imaging element 300 are each monolithic or integrated structures, the various optical paths shown in FIGS. 7 and 8 are not independent of each other. That is, any vibrations or other rotational and/or translational motions that may be encountered are inherently equally applied to all of the optical paths. Thus, any errors created by such rotational and/or translational motions are common-mode errors, and thus do not affect the accuracy of the determined measurements generated by the control system 170.

Furthermore, it should be appreciated that the "0° relative phase shift" interference portions, referred to as the $Q_0$ interference portions, and the "180° relative phase shift" interference portions, referred to as the $Q_2$ interference portions, are interleaved in a high spatial frequency checkerboard pattern across the surface of the detector device 340a. As a result, it should be appreciated that the various non-common mode errors present in the multiple phase shifted-image generating apparatus 200 shown in FIGS. 2–5, due to spatial separation of phase-shifted interferograms 149a and 149c in the $Q_0$ and $Q_2$ quadrants, are reduced, and, ideally, are eliminated. That is, because the 0° and 180° phase shift interference portions are adjacent to each other at each location throughout the detector device 340a, it can be assumed that each location is imaging substantially the same portion of portion of the object 130 in the 0° and 180° phase shift interference portions at each location. Furthermore, for the pixels at each location, inconsistencies in the transfer function from the incident light intensity to the output signal amplitude are reduced, and, ideally, are minimal. Thus, in various exemplary embodiments, errors related to these factors are reduced and/or minimized, and in many exemplary embodiments, ideally, are eliminated.

It should be appreciated that, in various exemplary embodiments according to this invention, such benefits arise because multiple phase-shifted interference image information 149 is provided for multiple phases within a small region on a detector subsystem 150. Stated another way, in various exemplary embodiments according to this invention, such benefits arise because a single image arising from a single sub-wavefront includes information for each of two or more different relative phase shifts, and that information is interleaved throughout the image. It should be appreciated that, in various exemplary embodiments according to this invention, the same benefits are derived from the "90° relative phase shift" interference portions, referred to as the $Q_1$ interference portions, and the "270° relative phase shift" interference portions, referred to as the $Q_3$ interference portions, that are interleaved in a high spatial frequency checkerboard pattern across the surface of the detector device 340b, for the same reasons.

It should be appreciated that the first exemplary embodiment of the multiple phase shift generating structure 140' and the exemplary phase shift imaging element 300 provide two different phases of relative phase-shift interference information arising from a single image that is derived from a single sub-wavefront. Similarly, the first exemplary embodiment of the multiple phase shift generating structure 140' and the exemplary phase shift imaging element 300 provide four different phases of relative phase-shift interference information arising from only two spatially-separated images that are each respectively derived from a single respective sub-wavefront.

In various exemplary embodiments, the components of the phase-shift imaging element 300 are selected and assembled to insure that the optical path lengths of the combined sub-wavefronts 129a and 129b are substantially equal. Thus, any focusing, aperture, and/or magnification properties, or the like, of the optical input portion 135' will produce the same image effects at the detector devices 340a and 340b. In various such exemplary embodiments, the neutral or blank plate 325 is omitted, but the high-density polarizer array 330a and the detector device 340a are rigidly set at a spacing that provides and optical path length equal to that of the quarter-wave plate 320.

In addition, in various exemplary embodiments, the detector devices 340a and 340b are selected as a matched set and/or calibrated to match the outputs of comparable detector elements of pixels between the two detector devices. It should be appreciated that using two detector devices allows the image of each respective sub-wavefront or image of the multiple phase-shifted interference image information 149a' and 149b' to be larger than can be obtained if both images are imaged into spatially separated regions of a single similarly-sized detector device. The available signal and spatial resolution of the phase shift imaging element 300 are improved accordingly.

However, this exemplary embodiment does have a partial disadvantage, in that differences in the nominal image light intensity and/or inconsistencies in the transfer function from the incident light intensity to the output signal amplitude may be present between the comparable detector elements or pixels of the different detector devices. It should be appreciated that due to such differences, some residual non-common mode errors remain in some, but not all, of the operations associated with the measurements generated by the control system 170. It should be appreciated further, that these residual errors are reduced in the various exemplary embodiments described above that match and/or calibrate the two detector devices.

Figure 9:
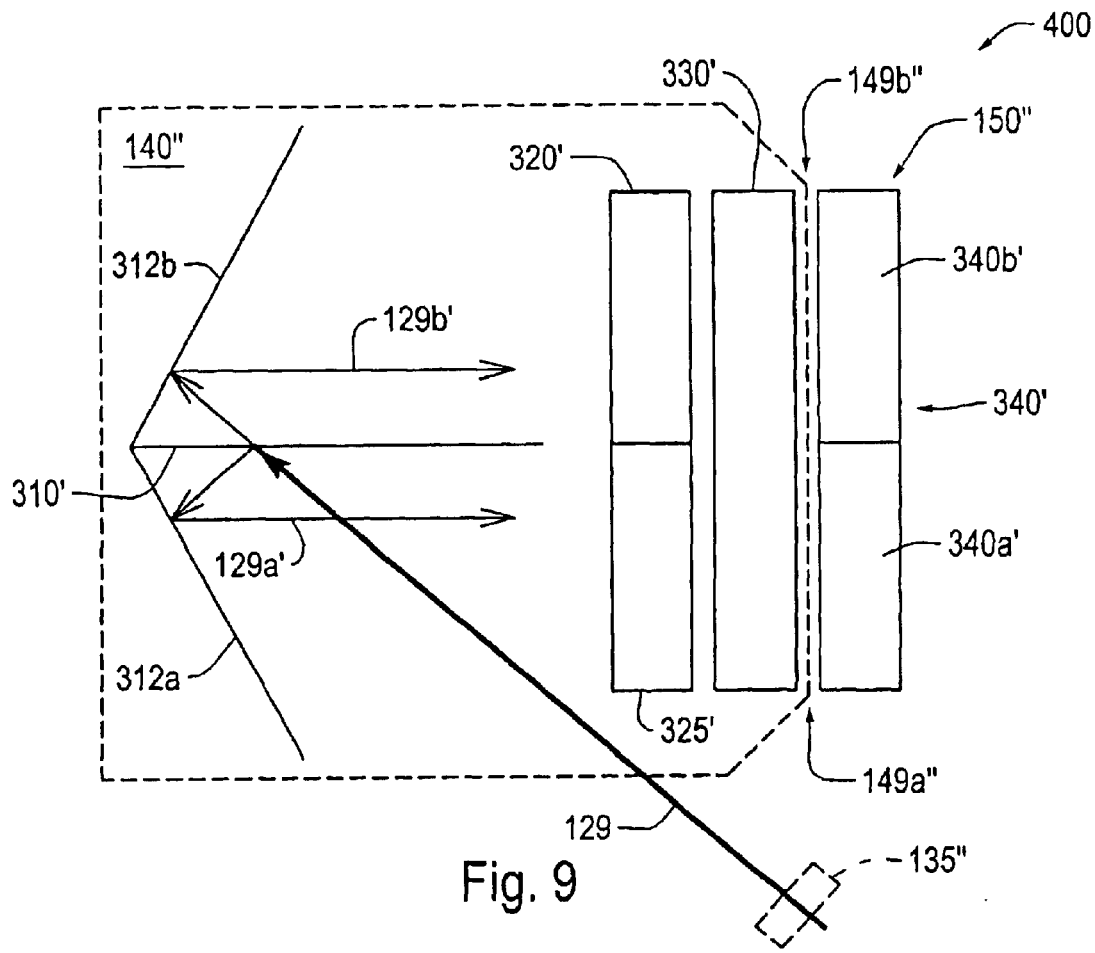
FIGS. 9 and 10 are plan views that illustrate a second exemplary phase-shift imaging element including a second exemplary embodiment of a multiple phase-shift generating structure incorporating a high-density polarizer array according to this invention.
Figure 10:
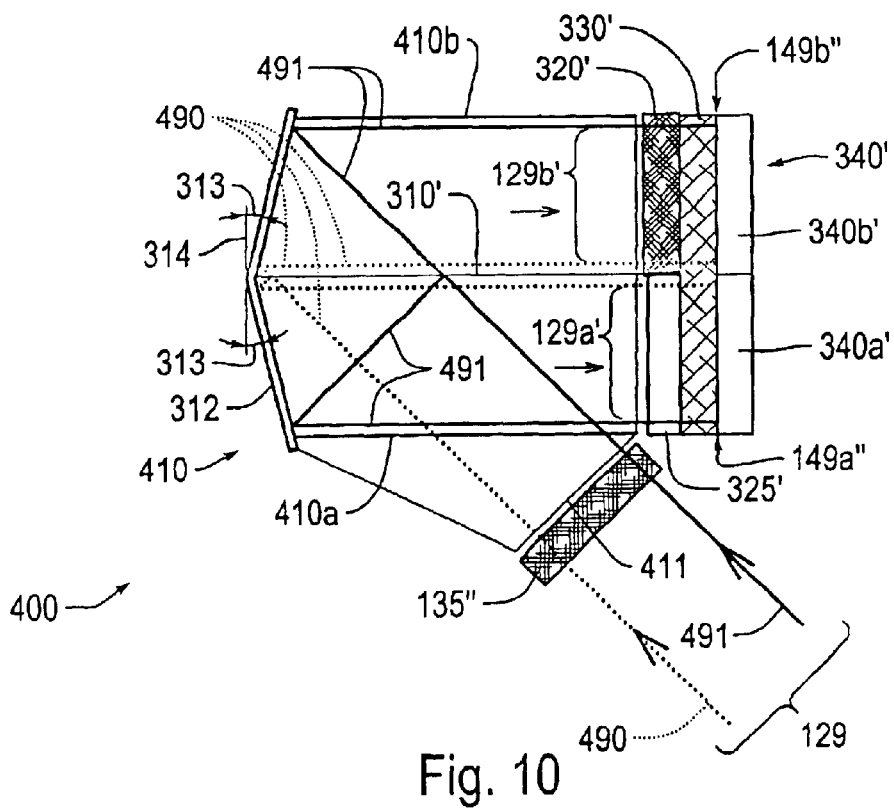

FIGS. 9 and 10 are plan views that illustrate a second exemplary phase-shift imaging element 400 according to this invention. As schematically shown in FIG. 9, the phase-shift imaging element 400 includes a second exemplary embodiment of a multiple phase-shift generating structure 140" according to this invention and a detector subsystem 150", which includes the detector device 340' having the detector device portions 340a' and 340b'. The multiple phase-shift generating structure 140" incorporates a high-density polarizer array 330' according to this invention. The multiple phase-shift generating structure 140" also includes a beam splitting surface 310', reflective surfaces 312a and 312b, a blank or neutral plate 325' and a quarter-wave plate 320'.

In the exemplary embodiment shown in FIG. 10, the beam splitting surface 310' and the reflective surfaces 312a and 312b of the phase-shift imaging element 400 are provided by an optical block assembly 410, which includes a lower block half 410a and an upper block half 410b. The upper and lower block halves 410a and 410b are joined at the non-polarizing beam splitting surface 310', according to any known or later-developed beam splitter fabrications methods. The upper and lower block halves 410a and 410b also have end surfaces, or mirror mounting surfaces, fabricated to provide or mount the reflective surfaces 312a and 312b. The remaining components of the phase-shift imaging element 400 are mounted to the opposite end of the optical block assembly 410, as shown.

The transmitted combined wavefront 129 passes through the optical block assembly 410, where the beam splitting surface 310' splits the combined wavefront 129 into the two respective combined sub-wavefronts or "copies" 129a' and 129b'. It should be appreciated that, due to the action of the beam splitting surface 310', the sub-wavefronts or "copies" 129a' and 129b' are mirror images of each other. However, with appropriate signal processing, this difference is inconsequential or, in various embodiment, even advantageous. The sub-wavefront 129a' is directed to the reflective surface 312a and reflected parallel to the beam splitting surface 310' along a first optical path on one side of the beam splitting surface 310'. In contrast, the sub-wavefront 129b' directed to the reflective surface 312b' and reflected parallel to the beam splitting surface 310' along a second optical path on the other side of the beam splitting surface 310'.

The dashed lines 490 and solid lines 491 illustrate first and second exemplary optical paths for different portions of the combined wavefront 129 as the combined wavefront 129 propagates through the phase-shift imaging element 400. It should be appreciated that the components of the phase-shift imaging element 400, as well as the orientation of the phase-shift imaging element 400 relative to the angle of incidence of the input combined wavefront 129, are arranged such that the total optical path lengths of the exemplary optical paths represented by the lines 490 and 491 are substantially equal. The same is true for all optical paths of the various portions of the combined wavefront 129 as the combined wavefront 129 propagates through the phase-shift imaging element 400.

In various exemplary embodiments, the optical block assembly 410 is arranged relative to the optical input portion 135" such that the combined wavefront 129 is received from a direction that is approximately normal to an input surface 411 of the optical block assembly 410. In various other exemplary embodiments, the input surface 411 intentionally deviates slightly from a normal orientation. This may be more advantageous than perfectly normal incidence when attempting to reduce spurious reflections and fringes. In either case, in various exemplary embodiments, the combined wavefront 129 propagates at a nominal angle of incidence of 45 degrees relative to the beam splitting surface 310'. In such embodiments, the end surfaces of the upper and lower block halves 410a and 410b are fabricated to provide each of the reflective surfaces 312a and 312b at an angle 313 of 22.5 degrees relative to a hypothetical plane 314 that is perpendicular to the beam splitting surface 310'.

The blank or neutral plate 325', a first portion of the high-density polarizer array 330', and the detector device portion 340a are aligned to receive and process the sub-wavefront 129a' along the first optical path on one side of the beam splitting surface 310'. Along this first optical path, the multiple phase-shift generating structure 140" generates multiple phase-shifted interference image information 149a" at its interface with the detector device portion 340a'. Similarly, the quarter-wave plate 320', a second portion of the high-density polarizer array 330', and the detector device portion 340b' are aligned to receive and process the sub-wavefront 129b' along the second optical path on the other side of the beam splitting surface 310'. Along this second optical path, the multiple phase-shift generating structure 140" generates multiple phase-shifted interference image information 149b" at its interface with the detector device portion 340b'.

It should be appreciated that, in various exemplary embodiments, the sub-wavefronts 129a' and 129b' are received and processed by similarly numbered elements in the same manner as described above for the sub-wavefronts 129a and 129b with respect to the phase-shift imaging element 300 shown in FIG. 8, in any of its various embodiments. In particular, the wavefronts 129a' and 129b' are received and processed by similarly numbered elements that are similarly constructed and oriented with respect to the polarization directions of the combined wavefronts 129a' and 129b'.

It should be further appreciated that the structure of the multiple phase-shifted interference image information 149a" and 149b" will, in various exemplary embodiments, be similar, or identical, to the structure of the multiple phase-shifted interference image information 149a' and 149b' described above with reference to the phase-shift imaging element 300 shown in FIG. 8, in any of its various embodiments. In various exemplary embodiments, when the detector device portions 340a' and 340b' are functionally identical to the detector devices 340a and 340b, the multiple phase-shifted interference image information 149a" and 149b" may be identical to the multiple phase-shifted interference image information 149a' and 149b'.

In any case, it should be appreciated that all of the previously-described features and benefits of the various embodiments of the multiple phase-shift generating structure 140' and the phase-shift imaging element 300 shown in FIG. 8 are similarly provided for by various embodiments of the multiple phase-shift generating structure 140" and the phase-shift imaging element 400 shown in FIGS. 9 and 10. In addition, in various exemplary embodiments, the multiple phase-shift generating structure 140" and the phase-shift imaging element 400 enjoy an additional advantage, in that the high-density polarizer array 330' is provided as a single element. In addition, in various embodiments, the detector device portions 340a' and 340b' may be portions of a single detector device, which provides not only more convenient assembly and signal processing, but also provides inherently improved matching between the gain characteristics, and the like, of all comparable image pixels. As a result, in various exemplary embodiments, both costs and measurement errors are further reduced in the phase-shift imaging element 400, in comparison to the phase-shift imaging element 300.

However, it should be further appreciated that the various embodiments of both the phase-shift imaging element 300 and the phase-shift imaging element 400 provide for four separate "phase signals" arising from the four interference information portions $Q_0$–$Q_3$, which have different relative phase-shifts, similar to both the multiple phase shifted-image generating apparatus 200 shown in FIGS. 2–5, and to previous systems that use 4 separate detector elements, such as that disclosed in Smythe, R., et al, "Instantaneous Phase Measuring Interferometry", Optical Engineering 23:4 (1984) 361–4. However, both of the phase-shift imaging elements 300 and 400 generally use simpler and/or fewer critical components, are easier to align and assemble, and/or are more stable and compact, while at the same time these elements eliminate at least some of the non-common mode errors found in prior art systems.

In various exemplary embodiments according to this of invention, the signal processing and software methods used are analogous to those described in the 330 patent. In particular, in various exemplary embodiments of an interferometer according to this invention, four separate "phase signals" are provided as described herein for each of one or more different wavelengths of the laser source 110. However, it should be appreciated that, in various exemplary embodiments according to this invention, the pixel-location coordinates processed in the equations disclosed in the 330 patent will be modified to correspond to the integrated pattern of the multiple phase-shifted interference image information 149 provided in the various exemplary embodiments according to this invention.

For example, Eq. 10 of the 330 patent indicates that, when the multiple phase-shifted interference image information 149 corresponds to that provided according to the description of FIGS. 2–5 herein, the phase at a particular (x,y) location may be calculated from comparable congruent pixels as:

$$\Phi(x,y) = \tan^{-1}\{[I_3(x,y) - I_1(x,y)]/[I_0(x,y) - I_2(x,y)]\} \quad (1)$$

where $I_0$, $I_1$, $I_2$ and $I_3$ are the respective intensities of each of the phase-shifted interferograms 149a–149d incident on the detector 240, i.e., the quadrants $Q_0$, $Q_1$, $Q_2$, and $Q_3$.

With regard to Eq. (1), in the related description set forth in the 330 patent, it should be understood that there are four congruent "sub-wavefront images" or interferograms in the multiple phase-shifted interference image information 149 corresponding to that provided according to the description of FIGS. 2–5 outlined above. As a result, comparable pixels in each image or interferogram are indicated to have "congruent pixel addresses" in the congruent images, regardless of whether these images are imaged onto different portions of a single detector array, or multiple detector arrays. Therefore, any related offsets of the actual signal processing addresses due to the actual offsets of comparable pixels on one or more detectors is assumed to be incorporated into the "congruent pixel addresses".

However, in the case of the multiple phase-shifted interference image information 149a' and 149b', or 149a" and 149b", provided by various embodiments of the phase-shift imaging elements 300 or 400, respectively, according to this invention, it should be appreciated that the multiple phase-shifted interference image information corresponding to the first sub-expression $[I_3(x,y)-I_1(x,y)]$ within Eq. (1), is interleaved in a single image 149b' or 149b" as the interference information portions $Q_3$ and $Q_1$ according to this invention. Thus, "congruent pixel addresses" are not appropriate for this first sub-expression within Eq. (1). Rather, for an embodiment according to this invention, where a single image of the multiple phase-shifted interference image information interleaves the interference portions $Q_3$ and $Q_1$, for any contiguous block of two interference portions $Q_3$ and $Q_1$ centered at a location (x,y), which are nominally identified as $Q_3(x,y)$ and $Q_1(x,y)$, one exemplary expression comparable to the first sub-expression above is:

$$[I_{Q3(x,y)} - I_{Q1(x,y)}],$$

where I indicates the image intensity value for each respective interference portion.

Similarly, in various exemplary embodiments according to this invention where a single image of the multiple phase-shifted interference image information interleaves the interference portions $Q_0$ and $Q_2$, for any contiguous block of two interference portions centered at a location (x,y), which are nominally identified as $Q_0$ and $Q_2$, one exemplary expression comparable to the second sub-expression $[I_0(x,y)-I_2(x,y)]$ within Eq. (1) above is:

$$[I_{Q0(x,y)} - I_{Q2(x,y)}].$$

It should be appreciated that, if each respective interference portion corresponds to a set of more than one pixel on the detector, then, in various exemplary embodiments, the image intensity value I indicates the average or representative intensity value for that entire set of pixels. The entire set of pixels can thus be regarded as a "meta-pixel". It should be appreciated that, in various exemplary embodiments, such meta-pixels have an extent corresponding to the extent of the first and second portions of a given high-density polarizer array 330 according to this invention, and such meta-pixels provide one desirable method of spatial averaging that is usable according to the principles of this invention.

It should also be appreciated that, in various exemplary embodiments, each individual interference portion may be a comparable interference portion involved in a measurement determination at at least four different (x,y) locations corresponding to the four borders of that comparable interference portion with its four comparable neighboring interference portions.

Thus, one total expression comparable to Eq. 10 in the 330 patent is:

$$\Phi(x,y) = \tan^{-1}\{[I_{Q3(x,y)} - I_{Q1(x,y)}]/[I_{Q0(x,y)} - I_{Q2(x,y)}]\}. \quad (2)$$

Alternatively, for any block of three contiguous interference portions along a row or column, that is, for interference portion patterns such as $Q_3-Q_1-Q_3$, $Q_1-Q_3-Q_1$, $Q_0-Q_2-Q_0$, or $Q_2-Q_0-Q_2$, centered at a location (x,y), the following exemplary alternative expression is also usable:

$$\Phi(x,y) = \tan^{-1}\{[I^{ave}_{Q3(x,y)} - I^{ave}_{Q1(x,y)}]/[I^{ave}_{Q0(x,y)} - I^{ave}_{Q2(x,y)}]\} \quad (3)$$

where $I^{ave}$ indicates the area-averaged image intensity value for each respective interference portion, regardless of whether there are one or two of the various respective interference portions in the three contiguous interference portions.

It should be appreciated that Eq. (3) averages the pixels on each side of an (x,y) center pixel, which nominally removes the minimal gradient or offset error present in Eq. (2). That is, a "comparable average" according to Eq. (3) has a nominal spatial location that, ideally, coincides with the (x,y) center pixel.

It should be appreciated that, with regard to the expressions in the above-outlined discussion, in various exemplary embodiments, the multiple phase-shifted interference image information 149a' and 149b' or the multiple phase-shifted interference image information 149a" and 149b", respectively, may be mirror images of each other, as previously described. In such cases, it should be appreciated that the (x,y) location address scheme is similarly a mirror image in the multiple phase-shifted interference image information 149a' and 149b' or the multiple phase-shifted interference image information 149a" and 149b", respectively. Such a "mirror image" (x,y) location address scheme for the "congruent (x,y) location addresses" makes the mirror image structure of the underlying images inconsequential or even, in various embodiments according to this invention, advantageous.

Based on the foregoing examples and discussion, various modifications and other signal processing methods usable with these and other embodiments according to this invention will be apparent to one skilled in the art.

It should be appreciated that, in various embodiments according to this invention, the two wavelength or "two color interferometry" signal processing and measurement determining methods described in the 330 patent may be applied, when the two wavelengths are close enough together that the various components of the various embodiments described herein are operable with either wavelength. In such a case, one expression for determining a distance or range to an object, comparable to Eq. 14 in the 330 patent, is:

$$R(x,y) = \{[(\lambda_1\lambda_2)/4\pi(\lambda_1-\lambda_2)] \times [\Phi_{\lambda 1}(x,y) - \Phi_{\lambda 2}(x,y)]\}, \quad (4)$$

where:
$\lambda_1$ and $\lambda_2$ are the two wavelengths;
$\Phi_{\lambda 1}$ is the phase determination for the first wavelength, determined according to Eq. (2), Eq. (3), or the like; and
$\Phi_{\lambda 2}$ is the phase determination for the second wavelength.

FIG. 11 is an exploded view illustrating a third exemplary embodiment of a phase-shift imaging element 500 according to this invention. As shown in FIG. 11, the phase-shift imaging element 500 includes including a third exemplary embodiment of a multiple phase-shift generating structure 140'" according to this invention and a detector subsystem 150'". In various exemplary embodiments, a single detector 340" of any suitable known or later-developed type is used to implement the detector subsystem 150'". The multiple phase-shift generating structure 140'" incorporates a high-density phase-shifting array element 322 according to this invention, combined with a high-density polarizer array 330" according to this invention. In contrast to previously described embodiments, no beam splitter is required in the phase-shift imaging element 500.

As shown in FIG. 11, the combined wavefront 129 is transmitted by the optical input portion 135'". The transmitted combined wavefront 129 includes the reference wavefront 124 and the object wavefront 128. The transmitted combined wavefront 129 propagates as a single wavefront that fills the high-density phase-shifting array element 322, which provides the combined functions of both a blank or neutral plate and a quarter-wave plate.

Neutral portions 1125 of the high-density phase-shifting array element 322 operate similarly to the blank or neutral plate 325 of the phase shift imaging element 300 shown in FIG. 8. Phase-shifting portions 1120 of the high-density phase-shifting array element 322 operate similarly to the quarter-wave plate 320 of the phase shift imaging element 300 shown in FIG. 8. Therefore, it should be appreciated that the transmitted combined wavefront 129 that propagates from the high-density phase-shifting array element 322 includes a pattern of interleaved portions corresponding to the pattern of neutral portions 1125 and phase-shifting portions 1120 included in the high-density phase-shifting array element 322. That is, the relative polarization orientations of the reference wavefront 124 and the object wavefront 128 are unchanged in the portions of the transmitted combined wavefront 129 that propagate through the neutral portions 1125. In contrast, the relative polarization orientations of the reference wavefront 124 and the object wavefront 128 are changed as previously described in the portions of the transmitted combined wavefront 129 that propagate through the phase-shifting portions 1120. Various embodiments of the high-density phase-shifting array element 322 are described in greater detail below.

The transmitted combined wavefront 129 passing out of the high-density phase-shifting array element 322 is directed onto a high-density polarizer array 330". In various exemplary embodiments, the active portion of the high-density phase-shifting array element 322 is mounted towards the high-density polarizer array 330". The high-density polarizer array 330" is fabricated by any of the methods previously described for the high-density polarizer array 330a shown in FIG. 8. The high density polarizer array 330" is also aligned and mounted relative to the detector elements of the detector 340" in a similar way to that previously described for the high-density polarizer array 330a shown in FIG. 8. It should be appreciated that, in various exemplary embodiments, a distance d (not shown) between the active portion of the high-density phase-shifting array element 322 and a detector surface of the detector 340" should be less than the maximum depth of focus of the image that is presented at the detector 340". In various exemplary embodiments, the distance d are approximately 1–2 mm or less. In various other exemplary embodiments, the distance d is less than 0.2 mm.

In various exemplary embodiments, the high-density polarizer array 330" includes a pattern of first polarizing portions 332 and second polarizing portions 334 that complement the pattern of the neutral portions 1125 and phase-shifting portions 1120 included in the high-density phase-shifting array element 322. The complementary patterns of the high-density phase-shifting array element 322 and the high-density polarizer array 330" combine to produce a desired 2-dimensionally interleaved pattern of first, second, third and fourth relative-phase interference portions that are interleaved at a high spatial frequency in the multiple phase-shifted interference image information 149'. Various exemplary embodiments of such complementary patterns, and the various resulting exemplary embodiments of the multiple phase-shifted interference image information 149' are described in greater detail below.

In any case, the 2-dimensionally interleaved pattern of first, second, third and fourth relative-phase interference portions in the multiple phase-shifted interference image information 149' that passes out of the high-density polarizer array 330" are received as a single image that extends substantially over the entire surface area of the detector device 340" that is used to implement the detector subsystem 150'". It should be appreciated that the 2-dimensionally interleaved pattern of first, second, third and fourth relative-phase interference portions in the multiple phase-shifted interference image information 149' corresponds to a high-density interleaving of the $Q_0$–$Q_3$ quadrants, 232–238, shown in FIG. 4, transmitted as a single image onto the surface of the detector device 340".

In a first exemplary embodiment of the phase-shift imaging element 500, the reference wavefront 124 and the object wavefront 128 are polarized along the orthogonal directions 132A and 133A shown in FIG. 11. In this first exemplary embodiment, the high-density polarizer array 330" includes a pattern 1130A, which includes the strip-like first polarizing portions 332A' and the strip-like second polarizing portions 334A', having respective polarization directions as indicated by the respective "grid lines" in the detailed view of the pattern 1130A. In such a case, it should be appreciated that the first polarization portions 332A' and the second polarization portions 334A' function similarly to the first polarization portions 332A and the second polarization portions 334A, respectively, as described above with reference to FIG. 8.

In this exemplary embodiment, when the high-density polarizer array 330" includes the pattern 1130A, the high-density phase-shifting array element 322 may include a pattern 1122, which includes strip-like neutral portions 1125 and strip-like phase-shifting portions 1120, alternatingly arranged as indicated in the detailed view of the pattern 1122. It should be appreciated that the patterns of the high-density phase-shifting array element 322 are not polarization sensitive. Thus, each pattern 1122, 1122' and the like of the high-density phase-shifting array element 322 are usable in combination with a variety of patterns of the high-density polarizer array 330", regardless of the polarization orientations of the reference wavefront 124 and the object wavefront 128 of the combined wavefront 129. The patterns of this first exemplary embodiment of the phase-shift imaging element 500 are described in greater detail with reference to FIG. 12.

In a second exemplary embodiment of the phase-shift imaging element 500, the reference wavefront 124 and the object wavefront 128 are polarized along the orthogonal directions 132B and 133B shown in FIG. 11. In this second exemplary embodiment, the high-density polarizer array 330" includes a pattern 1130B, which includes the first polarizing portions 332B and the second polarizing portions 334B, having respective polarization directions as indicated by the respective "grid lines" in the detailed view of pattern 1130B. In such a case, it should be appreciated that the first polarization portions 332B and the second polarization portions 334B may be identical to those similarly numbered elements described above with reference to FIG. 8. In this exemplary embodiment, when the high-density polarizer array 330" includes the pattern 1130B, the high-density phase-shifting array element 322 may include a pattern 1122', which includes neutral portions 1125' and phase-shifting portions 1120' arranged in a checkerboard pattern as indicated in the detailed view of the pattern 1122'. The patterns of this second exemplary embodiment of the phase-shift imaging element 500 are described in greater detail with reference to FIG. 13.

However, as previously indicated, there are a number of usable combinations of patterns of the high-density phase-shifting array element 322 and the high-density polarizer array 330". As one example, in a third exemplary embodiment of the phase-shift imaging element 500, the reference wavefront 124 and the object wavefront 128 are polarized along the orthogonal directions 132B and 133B shown in FIG. 11, and the high-density polarizer array 330" includes the pattern 1130B. In this exemplary embodiment, when the high-density polarizer array 330" includes the pattern 1130B, the high-density phase-shifting array element 322 may include the pattern 1122, which includes the strip-like neutral portions 1125 and the strip-like phase-shifting portions 1120, alternatingly arranged as indicated in the detailed view of the pattern 1122. The patterns of this third exemplary embodiment of the phase-shift imaging element 500 are described in greater detail with reference to FIG. 14.

In various exemplary embodiments, the high-density phase-shifting array element 322 is fabricated from a commercially available quarter-wave plate that matches the wavelength of the laser source 110. It should be appreciated that, in various exemplary embodiments, when two laser wavelengths are used to create and absolute interferometer, the wavelengths may be sufficiently similar so that one quarter-wave plate is suitable for both wavelengths. Thus, in such various exemplary embodiments, the quarter-wave plate automatically provides the phase-shifting portions of the high-density phase-shifting array element 322. As a result, only those portions of the quarter-wave plate that are to become the neutral portions 1125 are modified.

In particular, the quarter-wave plate is masked by any suitable known or later-developed method, such as methods used for thin film fabrication or the like. Accordingly, the pattern of the neutral portions 1125 can be etched into a surface of the quarter-wave plate by any suitable known or later-developed method, such as reactive ion etching or other suitable methods. The pattern of the neutral portions 1125 is etched to a depth such that the remaining thickness of the "quarter-wave" plate in regions of the neutral portions 1125 is that of a neutral or "full-wave" plate for the particular material used for the quarter-wave plate. For example, in various exemplary embodiments that use a typical commercially-available quartz quarter-wave plate, a nominal etch depth of 17.5 microns is suitable for a laser source that emits a laser wavefront having a wavelength of 633 nm.

In various exemplary embodiments, the etched surface of the high-density phase-shifting array element 322 abuts the high-density polarizer array 330". The high-density polarizer array 330" is bonded to the etched surface of the high-density phase-shifting array element 332 to form a monolithic assembly, which also includes the detector 340". In various other exemplary embodiments, the etched surface of the high-density phase-shifting array element 322 is planarized according to techniques known in the thin film and semiconductor processing fields. In various other exemplary embodiments, a wire-grid embodiment of the high-density polarizer array 330" is then fabricated on the planarized surface by known thin film techniques, as previously described.

In various exemplary embodiments, this planarization includes filling the etched portions of the etched surface of the high-density phase-shifting array element 322 with an optical material having an index of refraction that matches the index of refraction of the high-density phase-shifting array element 322 and that is amorphous or otherwise lacking a retardation effect. In various exemplary embodiments, as the surface is planarized, care is taken to avoid removing any phase shifting material. This may be accomplished by leaving a thin film of the neutral optical material over the entire surface of the phase-shifting array element 332.

In various exemplary embodiments, a wire-grid embodiment of a high-density polarizer array according to this invention may include "barrier strips" of a light-blocking material that coincides with the edges of the first and second polarizing portions and/or the intended alignment of the edges of the neutral portions of the complementary high-density phase-shifting array element according to this invention.

In some of these exemplary embodiments, the barrier strips have a width sufficient to occlude any sloped portion of the etched sidewalls of the neutral portions of the high-density phase-shifting array element 332". In some of these exemplary embodiments, the barrier strips are also wide enough to prevent unwanted leakage from a particular interference portion of the multiple phase-shifted interference image information 149 into an unintended detector element or pixel. For example, such leakage could occur due to various alignment tolerances during fabrication and assembly of a phase-shift imaging element according to this invention.

It should be appreciated that various exemplary embodiments of the multiple phase shift generating structure 140''' and the exemplary phase shift imaging element 500 provide three or more different phases, including but not limited to the three different phase and four different phases disclosed in relation to various exemplary embodiments, of relative phase-shift interference information arising from a single image that is derived from a single undivided wavefront. Thus, it should be appreciated that all of the previously described features and benefits of the various embodiments of the multiple phase-shift generating structure 140' and the phase-shift imaging element 300 shown in FIG. 8, and the multiple phase-shift generating structure 140" and the phase-shift imaging element 400 shown in FIGS. 9 and 10, are similarly provided by various embodiments of the multiple phase-shift generating structure 140''' and the phase-shift imaging element 500 shown in FIG. 11.

In addition, in various exemplary embodiments, the multiple phase-shift generating structure 140''' and the phase-shift imaging element 500 shown in FIG. 11 enjoy an additional advantage in that the high-density phase-shifting array element 332 is provided as a single element. Furthermore, because the high-density phase-shifting array element 332 allows more than two different "types" of interference portions to be provided along a single optical path, that is, within a single image on the detector 340", no beam splitting element is required. This results not only in fewer optical element aberrations and more convenient assembly and/or signal processing, but also in improved matching between the gain characteristics and the like, of all comparable image pixels. This occurs because all comparable pixels are located in the same small region of the detector.

Furthermore, all comparable pixels are located in the same small region of the detector. Accordingly, the optical path lengths from a particular portion of the object to each of the particular corresponding $Q_0$–$Q_3$ interference portions in a particular local portion of the multiple phase-shifted interference image information 149' are inherently similar. Thus, the related relative phase-shift information and the related measurement determination will generally be insensitive to reasonably expected rotational and/or translational motions of the exemplary phase shift imaging element 500. As a result, in various exemplary embodiments, both costs and measurement errors are further reduced in the phase-shift imaging element 500, in comparison to the phase-shift imaging elements 400 and 300.

Figure 12:
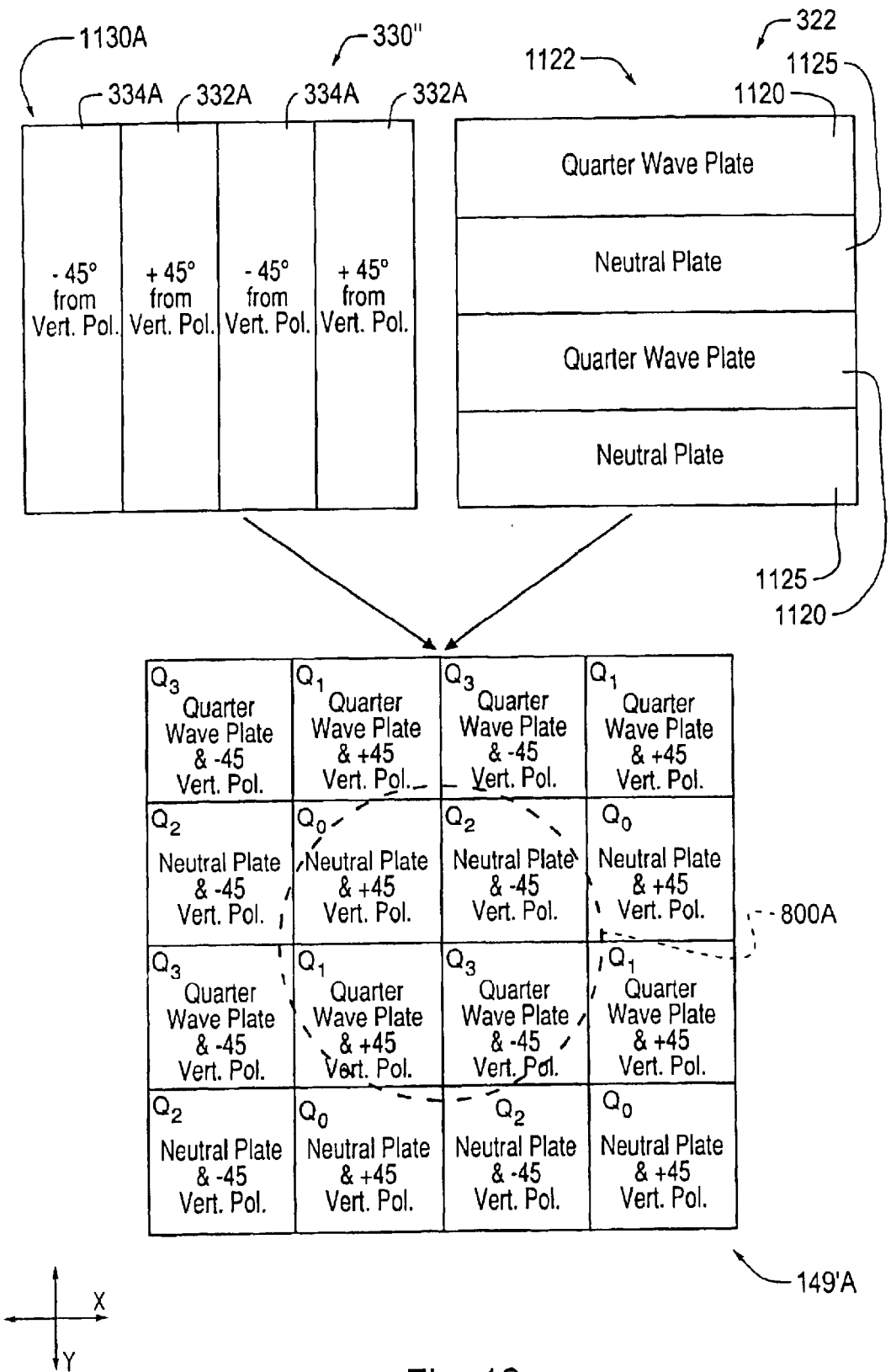
FIG. 12 is a schematic diagram illustrating in greater detail a first exemplary embodiment of the third exemplary embodiment of the multiple phase-shift generating structure shown in FIG. 11 that incorporates a high-density polarizer array according to this invention combined with a high-density phase-shifting array element according to this invention.
Figure 14:
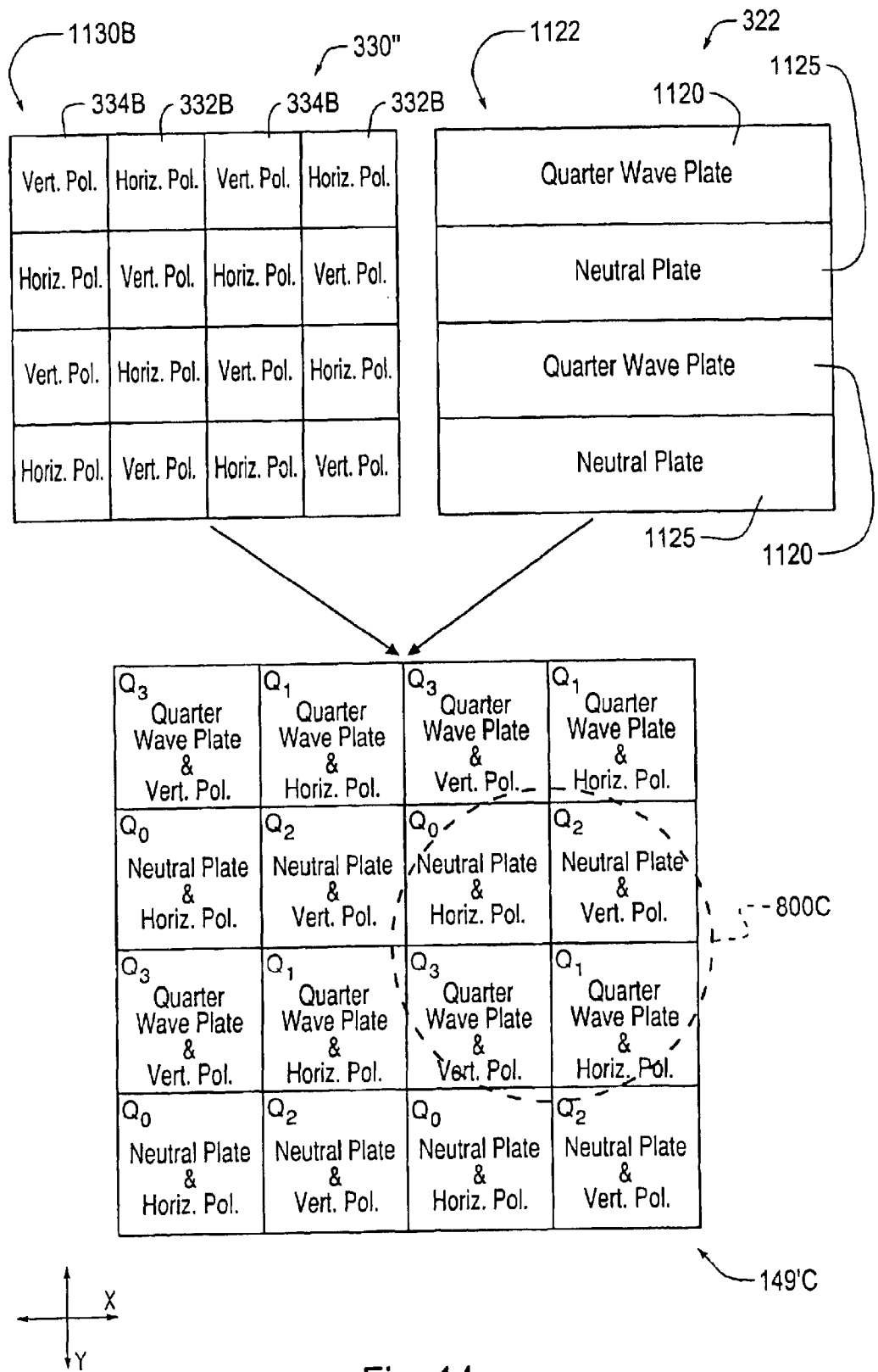
FIG. 14 is a schematic diagram illustrating in greater detail a third exemplary embodiment of the third exemplary embodiment of the multiple phase-shift generating structure shown in FIG. 11 that incorporates a high-density polarizer array according to this invention combined with a high-density phase-shifting array element according to this invention.

FIGS. 12–14 are schematic diagrams illustrating in greater detail patterns and operation of the first, second and third particular embodiments of the third exemplary embodiment of the multiple phase-shift generating structure 140''' shown in FIG. 11 that incorporates a high-density polarizer array according to this invention combined with a high-density phase-shifting array element according to this invention.

In particular, FIG. 12 is a schematic diagram illustrating the patterns and operation of the first exemplary embodiment of the phase-shift imaging element 500 described above with reference to FIG. 11. This first exemplary embodiment is usable when the reference wavefront 124 and the object wavefront 128 are polarized along the orthogonal directions 132A and 133A shown in FIG. 11. FIG. 12 shows a portion of the exemplary pattern 1130A of the high-density polarizer array 330" and, a portion of the exemplary pattern 1122 of the high-density phase-shifting array element 322 that is nominally aligned with the portion of the exemplary pattern 1130A. These elements have been previously described with reference to the first exemplary embodiment of the phase-shift imaging element 500 shown in FIG. 11.

FIG. 12 also shows a nominally aligned portion of the resulting interleaved pattern 149'A of "$Q_0$–$Q_3$" interference portions in the multiple phase-shifted interference image information 149' that is transmitted as a single image onto the surface of the detector device 340". This interleaved pattern 149'A is obtained from the combination of the pattern 1130A of the high-density polarizer array 330" and the pattern 1122 of the high-density phase-shifting array element 322, as described above with reference to the first exemplary embodiment of the phase-shift imaging element 500 shown in FIG. 11. The optical generation and characteristics of the various $Q_0$–$Q_3$ interference portions are the same as previously described. A nominal lateral resolution indicator 800A is also shown, as discussed in detail further below.

In various exemplary embodiments, the edges of the $Q_0$–$Q_3$ interference portions in the multiple phase-shifted interference image information 149'A are nominally aligned with the edges of detector elements of the detector device 340". That is, each of the $Q_0$–$Q_3$ interference portions are an integer number of pixels high, and an integer number of pixels wide, and are nominally aligned with a corresponding set of pixels. For example, in various exemplary embodiments, when only coarse lateral resolution is required, the integer number of pixels may be on the order of approximately 16 pixels or more. In various exemplary embodiments where finer lateral resolution is required, the integer number of pixels may be on the order of approximately 4–8 pixels. In various exemplary embodiments where the finest lateral resolution is required, the integer number of pixels may be approximately 1–4 pixels. The dimensions of the various elements of the high-density polarizer array 330" and the high-density phase-shifting array element 322 are designed accordingly, and will be apparent to one skilled in the art.

As described above, this first exemplary embodiment of the phase-shift imaging element 500 provides four different phases of relative phase-shift interference information, that is, the $Q_0$–$Q_3$ interference information portions, arising from a single image. Thus, this first exemplary embodiment of the phase-shift imaging element 500 provides four separate "phase signals" arising from the four $Q_0$–$Q_3$ interference information portions, similar to the phase signals provided by the phase-shift imaging elements 300 and 400, described above.

Thus, by analogy with discussions above related to Eq. (2) and FIGS. 8–10, for various exemplary embodiments according to this invention where a single image of the multiple phase-shifted interference image information interleaves the four $Q_0$–$Q_3$ interference information portions, as shown in FIG. 12, for any 2×2 region of four contiguous different interference portions centered at a location (x,y), which will nominally be the interference portions $Q_3(x,y)$, $Q_1(x,y)$, $Q_0(x,y)$ and $Q_2(x,y)$, one expression comparable to Eq. 10 in the 330 patent and to Eq. (2) above is:

$$\Phi(x,y)=\tan^{-1}\{[I_{Q3(x,y)}-I_{Q1(x,y)}]/[I_{Q0(x,y)}-I_{Q2(x,y)}]\} \quad (5)$$

where I indicates the image intensity value for each respective interference portion.

Similarly to the discussion above related to Eqs. (2) and (3), it should be appreciated that, if each respective interference portion corresponds to a set of more than one pixel on the detector, in various exemplary embodiments the image intensity value I indicates the average or representative intensity value for that entire set of pixels. The entire set of pixels can thus be regarded as a "meta-pixel". It should be appreciated that, in various exemplary embodiments, such meta-pixels have an extent corresponding to the extent of the respective overlapping area combinations of the first and second portions of a high-density polarizer array 330" and the first and second portions of a high-density phase-shifting array element 322 according to this invention. In various exemplary embodiments, such meta-pixels provide one desirable method of spatial averaging usable according to the principles of this invention.

Also similarly to the discussion above related to Eqs. (2) and (3), it should be appreciated that, in various exemplary embodiments, each individual interference portion may be a comparable interference portion involved in a measurement determination at at least four different (x,y) locations corresponding to the four borders of the individual interference portion with the four comparable individual neighboring interference portions that neighbor, e.g., are adjacent to, that individual interference portion.

Furthermore, by analogy with discussions outlined above related to Eq. (3), for any 3×3 region of nine contiguous interference portions centered at a location (x,y) coinciding with the central pixel, the following exemplary alternative expression is also usable:

$$\Phi(x,y)=\tan^{-1}\{[I^{ave}_{Q3(x,y)}-I^{ave}_{Q1(x,y)}]/[I^{ave}_{Q0(x,y)}-I^{ave}_{Q2(x,y)}]\} \quad (6)$$

where $I^{ave}$ indicates the area-averaged image intensity value for each respective interference portion, regardless of whether there are one, two, or four of the various respective interference portions in the region of nine contiguous interference portions.

It should be appreciated that Eq. (6) averages the pixels on each side of an (x,y) center pixel, which nominally removes the minimal gradient or offset error present in Eq. (5). That is, in various exemplary embodiments, a "comparable average" according to Eq. (6) has a nominal spatial location that, ideally, coincides with the (x,y) center pixel. It should be appreciated that, in various exemplary embodiments, each individual interference portion may be a comparable interference portion involved in a measurement determination at at least eight different (x,y) locations corresponding to the four edge-adjacent comparable neighboring interference portions of that individual interference portion, and the four diagonally-located comparable neighboring interference portions of that individual interference portion.

Based on the foregoing examples and discussion, various modifications and other signal processing methods usable with these and other embodiments according to this invention will be apparent to one skilled in the art.

FIG. 13 is a schematic diagram illustrating the patterns and operation of the second exemplary embodiment of the phase-shift imaging element 500, as described above with reference to FIG. 11. This second exemplary embodiment is usable when the reference wavefront 124 and the object wavefront 128 are polarized along the orthogonal directions 132B and 133B shown in FIG. 11. FIG. 13 shows a portion of the exemplary pattern 1130B of the high-density polarizer array 330", and a portion of the exemplary pattern 1122' of the high-density phase-shifting array element 322 that is nominally aligned with the portion of the exemplary pattern 1130B. These elements have been previously described with reference to the second exemplary embodiment of the phase-shift imaging element 500 shown in FIG. 11.

FIG. 13 also shows a nominally-aligned portion of the resulting interleaved pattern 149'B of $Q_0$–$Q_3$ interference portions in the multiple phase-shifted interference image information 149' that is transmitted as a single image onto the surface of the detector device 340". This interleaved pattern 149'A is obtained from the combination of the pattern 1130B of the high-density polarizer array 330" and the pattern 1122' of the high-density phase-shifting array element 322, as described above with reference to the second exemplary embodiment of the phase-shift imaging element 500 shown in FIG. 11. The optical generation and characteristics of the various $Q_0$–$Q_3$ interference portions are the same as previously described. A nominal lateral resolution indicator 800B is also shown, as discussed in detail further below.

Similarly to the first exemplary embodiment described with reference to FIG. 12, in various exemplary embodiments, the edges of the $Q_0$–$Q_3$ interference portions in the multiple phase-shifted interference image information 149' are nominally aligned with the edges of detector elements of the detector device 340". That is, each of the $Q_0$–$Q_3$ interference portions are an integer number of pixels high, and an integer number of pixels wide, and are nominally aligned with a corresponding set of pixels. The dimensions of the various elements of the high-density polarizer array 330" and the high-density phase-shifting array element 322 are designed accordingly, and will be apparent to one skilled in the art.

It should be appreciated that this second exemplary embodiment also provides four separate "phase signals" arising from the four $Q_0$–$Q_3$ interference information portions, similar to the four phase signals provided by the first exemplary embodiment described above. Thus, by analogy with the discussions outlined above related to the first exemplary embodiment shown in FIG. 12, Eq. (5) is also usable with this second exemplary embodiment, for any 2×2 region of four contiguous different interference portions centered at a location (x,y). However, it should be appreciated that, due to the particular structure of the second exemplary embodiment, as shown by the dashed outline lines in the pattern 149'B shown in FIG. 13, the centers of regions of four contiguous different interference portions occur only at (x,y) locations coinciding with the centers of the edges between a quarter-wave plate portion 1120' and a neutral plate portion 1125'. Thus, Eq. (5) may only be applied to make measurement determinations at these particular locations for the second exemplary embodiment.

However, it should be appreciated that at each (x,y) location midway between the aforementioned (x,y) locations coinciding with the centers of the edges between a quarter-wave plate portion 1120' and a neutral plate portion 1125', the "averaging" Eq. (6) is usable with this second particular embodiment, for a region of eight contiguous interference portions that is 2 interference portions wide along the x direction and 4 interference portions high along the y direction, or vice-verse. Based on the foregoing examples and discussion, various modifications and other signal processing methods usable with the second exemplary embodiment will be apparent to one skilled in the art.

FIG. 14 is a schematic diagram illustrating the patterns and operation of the third exemplary embodiment of the phase-shift imaging element 500 as described above with reference to FIG. 11. This third exemplary embodiment is usable when the reference wavefront 124 and the object wavefront 128 are polarized along the orthogonal directions 132B and 133B shown in FIG. 11. FIG. 14 shows a portion of the exemplary pattern 1130B of the high-density polarizer array 330", and a portion of the exemplary pattern 1122 of the high-density phase-shifting array element 322 that is nominally aligned with the portion of the exemplary pattern 1130B. These elements have been previously described with reference to the third exemplary embodiment of the phase-shift imaging element 500 shown in FIG. 11.

FIG. 14 also shows a nominally-aligned portion of the resulting interleaved pattern 149'C of $Q_0$–$Q_3$ interference portions in the multiple phase-shifted interference image information 149' that is transmitted as a single image onto the surface of the detector device 340". This interleaved pattern 149'C is obtained from the combination of the pattern 1130B of the high-density polarizer array 330" and the pattern 1122 of the high-density phase-shifting array element 322, as described above with reference to the third exemplary embodiment of the phase-shift imaging element 500 shown in FIG. 11. The optical generation and characteristics of the various $Q_0$–$Q_3$ interference portions are the same as previously described. A nominal lateral resolution indicator 800C is also shown, as discussed in detail further below.

Similarly to the first exemplary embodiment described with reference to FIG. 12, in various exemplary embodiments, the edges of the $Q_0$–$Q_3$ interference portions in the multiple phase-shifted interference image information 149' are nominally aligned with the edges of detector elements of the detector device 340". That is, each of the $Q_0$–$Q_3$ interference portions are an integer number of pixels high, and an integer number of pixels wide, and are nominally aligned with a corresponding set of pixels. The dimensions of the various elements of the high-density polarizer array 330" and the high-density phase-shifting array element 322 are designed accordingly, and will be apparent to one skilled in the art.

It should be appreciated that this third exemplary embodiment provides four separate "phase signals" arising from the four $Q_0$–$Q_3$ interference information portions, similar to the four phase signals provided by the first exemplary embodiment described above with respect to FIG. 12. Despite a minor difference in the arrangement of the four $Q_0$–$Q_3$ interference information portions between the pattern 149'A of the first exemplary embodiment shown in FIG. 12 and the pattern 149'C of this third exemplary embodiment, Eq. (5) is similarly usable with this third exemplary embodiment, for any 2×2 region of four contiguous different interference portions centered at a location (x,y). Similarly, for any 3×3 region of nine contiguous interference portions centered at a location (x,y) coinciding with a central pixel, Eq. (6) is usable. Based on the foregoing examples and discussion, various modifications and other signal processing methods usable with the third particular embodiment will be apparent to one skilled in the art.

FIG. 15 is a schematic diagram illustrating the patterns and operation of a fourth exemplary embodiment of the phase-shift imaging element 500. This fourth exemplary embodiment usable when the reference wavefront 124 and the object wavefront 128 are polarized along the orthogonal directions 132B and 133B shown in FIG. 11. In contrast to the embodiments illustrated in FIGS. 12–14, the embodiment illustrated in FIG. 15 shows an exemplary embodiment that provides only 3 different interference portions, the $Q_0$, $Q_1$ and $Q_3$ interference portions. Thus, this exemplary embodiment is usable for measurement determinations that use only 3 phases.

FIG. 15 shows a portion of an alternative exemplary pattern 1130B' of the high-density polarizer array 330", and a portion of an alternative exemplary pattern 1122" of the high-density phase-shifting array element 322 that is nominally aligned with the portion of the exemplary pattern 130B'. The general characteristics of these elements are similar to those previously described with reference to the similarly number elements shown in FIG. 11. FIG. 15 also shows a nominally aligned portion of the resulting interleaved pattern 149'D of $Q_0$, $Q_1$, and $Q_3$ interference portions in the multiple phase-shifted interference image information 149' that is transmitted as a single image onto the surface of the detector device 340". This interleaved pattern 149'D is obtained from the combination of the pattern 1130B' of the high-density polarizer array 330" and the pattern 1122" of the high-density phase-shifting array element 322, in this fourth exemplary embodiment of the phase-shift imaging element 500 shown in FIG. 11. The optical generation and characteristics of the various $Q_0$, $Q_1$, and $Q_3$ interference portions are the same as previously described.

Similarly to the first exemplary embodiment described with reference to FIG. 12, in various exemplary embodiments, the edges of the $Q_0$, $Q_1$ and $Q_3$ interference portions in the multiple phase-shifted interference image information 149' are nominally aligned with the edges of detector elements of the detector device 340". That is, each of the $Q_0$, $Q_1$, and $Q_3$ interference portions are an integer number of pixels high, and an integer number of pixels wide, and are nominally aligned with a corresponding set of pixels. The dimensions of the various elements of the high-density polarizer array 330' and the high-density phase-shifting array element 322 are designed accordingly, and will be apparent to one skilled in the art.

It should be appreciated that this fourth exemplary embodiment provides three separate "phase signals" arising from the three $Q_0$, $Q_1$ and $Q_3$ interference information portions. Due to this minor difference between the pattern 149'A of the first exemplary embodiment and the pattern 149'D of this fourth exemplary embodiment, instead of Eq. (5), Eq. (7) is usable with this third exemplary embodiment, for any three contiguous different interference portions centered at a location (x,y). The three contiguous different interference portions may be along a row, along a column, or an "L" shape of any orientation. In the case of an "L" shape, the (x,y) location is nominally the interior corner of the "L". Thus, for any region of three such contiguous different interference portions centered at a location (x,y), which will nominally be identified as the interference portions $Q_3(x,y)$, $Q_1(x,y)$, and $Q_0(x,y)$, one expression comparable to Eq. 10 in the 330 patent and to Eq. (2) above is:

$$\Phi(x,y) = \tan^{-1}\{[I_{Q3(x,y)} - I_{Q1(x,y)}]/[2I_{Q0(x,y)} - (I_{Q3(x,y)} + I_{Q1(x,y)})]\} \quad (7)$$

where I indicates the image intensity value for each respective interference portion.

Similarly, because this fourth exemplary embodiment provides only three separate "phase signals" arising from the three $Q_0$, $Q_1$, and $Q_3$ interference information portions, due to this minor difference between the pattern 149'A of the first exemplary embodiment and the pattern 149'D of this fourth exemplary embodiment, instead of Eq. (6), Eq. (8) is usable with this fourth exemplary embodiment. Thus, for any 4 contiguous interference portions, which can include at least three different types of interference portions, centered at a location (x,y), Eq. (8) is usable. The four contiguous interference portions may be along a row, along a column, or within a 2×2 block. That is, the following exemplary alternative expression is also usable:

$$\Phi(x,y) = \tan^{-1}\{[I^{ave}_{Q3(x,y)} - I^{ave}_{Q1(x,y)}]/2[2I^{ave}_{Q0(x,y)} - (I_{Q1(x,y)})]\} \quad (8)$$

where I indicates the image intensity value for each respective interference portion.

It should be that in each of Eqs. (7) and (8), in comparison to Eqs. (5) and (6), the "$I_{Q2(x,y)}$" terms are absent. Thus, some of the signal offsets that may be present in the $I_{Q0(x,y)}$ signals are not removed. However, because of the previously described "common-mode" error benefits that are obtained when using various embodiments according to the principle of this invention, many of the signal offsets in the $I_{Q0(x,y)}$ signals can be assumed to be the same as those in the $I_{Q3(x,y)}$ and $I_{Q1(x,y)}$ signals. Thus, it should be appreciated that subtracting the sub-expression $(I^{ave}_{Q3(x,y)} + I^{ave}_{Q1(x,y)})$ in Eq. (8) effectively removes most of the offset effects present in the $I_{Q0(x,y)}$ signals.

Thus, despite a minor disadvantage, the pattern configurations shown in FIG. 15, as well as other patterns configurations producing various combinations of 3 different interference portions, are usable in various embodiments according to the principles of this invention. Based on the foregoing examples and discussion, various modifications and other signal processing methods usable with the fourth particular embodiment will be apparent to one skilled in the art. More generally, based on the foregoing examples and discussion related to the various patterns shown in FIGS. 12–15, various other pattern modifications and other pattern combinations usable according to the principles of this invention will be apparent to one skilled in the art.

Figure 16:
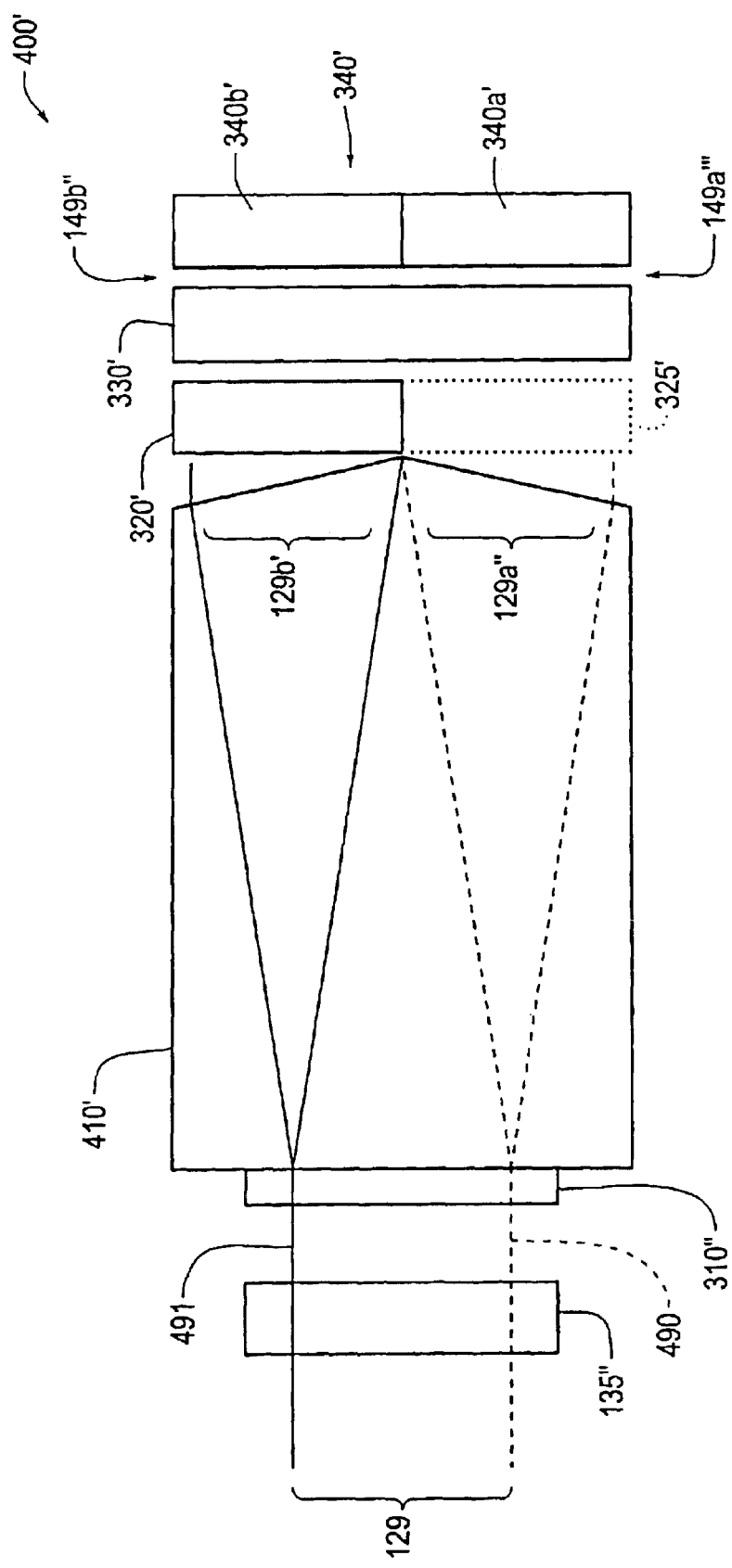
FIG. 16 is a plan view that illustrates a fourth exemplary embodiment of phase-shift imaging element according to this invention that includes a diffractive optical element in place of a beam splitter.

FIG. 16 shows one exemplary embodiment of phase-shift imaging element 400' which functions similarly to the phase-shift imaging element 400 shown in FIG. 10. Thus, the following detailed description of FIG. 16 focuses only on the distinctions between the phase-shift imaging elements 400 and 400'. In the phase-shift imaging element 400' shown in FIG. 16, the beam splitting surface 310' and the reflective surfaces 312a and 312b used in the phase-shift imaging element 400 are replaced by a diffractive optical element 310", which functions similarly to the beam-splitting surface 310' to split the combined wavefront 129 into two respective combined sub-wavefronts or "copies" 129a" and 129b' along respective optical paths. It should be appreciated that the various angles, lengths and proportions shown in FIG. 16 are illustrative only, and may be exaggerated for clarity. In various exemplary embodiments, the chosen angles, lengths and proportions will depend heavily on the divergence of the optical beams that is achievable with a particular diffractive optical element 310".

It should be appreciated that the diffractive optical element 310" is fabricated such that the sub-wavefront 129a", in contrast to the wavefront 129a' shown in FIG. 10, is not a mirror image of the sub-wavefront 129b'. Furthermore, the optical block assembly 410', in contrast to the optical block 410, is a block of homogeneous material, which acts primarily to provide various mounting surfaces and to maintain critical spacing in various embodiments of the phase-shift imaging element 400'. Depending on the orientation of the sub-wavefronts 129a" and 129b' provided by the diffractive optical element 310", in various exemplary embodiments, the optical block 410 includes a prism-shaped end portion positioned adjacent to the blank or neutral plate 325' and the quarter wave plate 320'. The configuration of the prism shaped end of the optical block 410 is selected to insure that the optical path lengths of the exemplary optical paths represented by the lines 490 and 491 are substantially equal. The same is true for all optical paths of the various portions of the combined wavefront 129 as it propagates through the phase-shift imaging element 400'.

In other respects, the phase-shift imaging element 400' functions similarly to the phase-shift imaging element 400 shown in FIG. 10. Thus, it should be appreciated that all of the previously described features and benefits of the various embodiments of the multiple phase-shift generating structure 140" and the phase-shift imaging element 400 shown in FIG. 10 are similarly provided by various embodiments of the phase-shift imaging element 400' shown in FIG. 16.

As previously discussed, in various exemplary embodiments, for a laser source wavelength of approximately 633 nm, the high-density phase-shifting array element 322 can be a typical, commercially-available quartz quarter-wave plate, having the regions of the neutral portions 1125 etched to a nominal etch depth of 17.5 microns. To conveniently and/or economically fabricate such a high-density phase-shifting array element 322, in various embodiments, it is advantageous that the minimum x and/or y dimension of the regions 1125, 1125' and 1125" shown in FIGS. 12–16 are approximately the same as the etch depth or layer.

Thus, in various exemplary embodiments when the pixel size and center-to-center spacing of the detector elements of the detector 340" is approximately 6 microns, and each of the $Q_0$–$Q_3$ interference portions in the multiple phase-shifted interference image information 149'A, 149'B or 149'C are an integer number of pixels high and an integer number of pixels wide, the minimum $Q_0$–$Q_3$ interference portions may be regions having side lengths of approximately 3×6=18 microns, or 4×6=24 microns, etc. Accordingly, in the exemplary embodiments shown in FIGS. 12–16, each of the portions 332 and 334 could have side lengths of approximately 18 microns. In a complementary way, the corresponding quarter-wave plate and neutral plate portions 1120 and 1125 shown in FIGS. 12 and 14 would have narrow dimensions of 18 microns. Similarly, in FIG. 13, the quarter-wave plate and neutral plate portions 1120" and 1125" would have side lengths of approximately 2×18= 36 microns.

Of course, in various exemplary embodiments, larger or smaller dimensions may also be used. It should be appreciated that, as new materials and/or processes are obtained that allow for thinner quarter-wave dimensions or that allow for higher aspect ratios between the etching depths and the lengths of the sides of the neutral and quarter-wave regions 1120 and 1125, and the like, the dimensions of the can be economically reduced down to the limit of the dimensions of the underlying pixels of the detector 340". It should also be appreciated that, more generally, in various embodiments, the aspect ratio of the each of the $Q_0$–$Q_3$ interference portions in the multiple phase-shifted interference image information 149'A, 149'B, 149'C and/or 149'D will match the aspect ratio of the pixels of the detector 340". The dimensions of the various elements of the high-density polarizer array 330" and the high-density phase-shifting array element 322 will be designed accordingly, and will be apparent to one skilled in the art.

In various exemplary embodiments of the phase-shift imaging elements 300, 400, 400' and/or 500 according to this invention, the optical input portion 135 as representative of the various embodiments 135', 135" or 135''', includes a half-wave plate at its output, and outputs the combined wavefront 129 from the output imaging lens through the half-wave plate. As is known in the art, a selected orientation of the fast axis of the half-wave plate can rotate the polarization of the two orthogonally polarized incident wavefronts 124 and 128, which form the combined wavefront 129, by a selected amount. For example, either of orientations along the directions 132A and 133A, or along the directions 132B and 133B, as shown in FIGS. 8 and 11, are easily achieved, regardless of the initial orientation of the orthogonally polarized incident wavefronts 124 and 128 prior to entering the optical input portion 135. Of course, alternatively, the entire phase-shift imaging element may be rotated around the optical input axis to achieve a desired polarization angle relationship. However, this may be more complicated, unstable, or inconvenient than including an adjustable half-wave plate in the optical input portion 135.

Furthermore, in various exemplary embodiments of the phase-shift imaging elements 300, 400, 400' and/or 500 according to this invention, the optical input portion 135 as representative of the various embodiments 135', 135" or 135''' inputs the combined wavefront 129 through an "input" imaging lens, then spatially filters the combined wavefront 129 through an aperture, and propagates the resulting combined wavefront 129 through an "output" imaging lens. Such telecentric arrangements are known in the art for various interferometers that are similar to that shown in FIG. 1. The lenses of the optical input portion 135 may have a focal length f, and may provide a magnification M. It should be appreciated that the values for these parameters can be appropriately selected for a particular application of an apparatus according to this invention by experimentation or it can be appropriately selected by basic optical analysis.

In various exemplary embodiments according to this invention, two related considerations when appropriately selecting the values for these parameters are the speckle size, i.e., the size of speckles that are produced by certain objects at the surface of the detectors in various embodiments of the detector subsystem 150, and the lateral resolution determined by the optical input portion 135. In general, in applications where speckle is present, the nominal speckle size coincides with the nominal lateral resolution of the system.

In various exemplary embodiments, Eq. (9) can be used to analyze and adjust nominal lateral resolution LR, and/or nominal speckle size S:

$$LR=S=1.22(M+1)*\lambda*f/a, \tag{9}$$

where:

M is the magnification;

f is the focal length of the imaging lenses;

a is the effective aperture dimension; and $\lambda$ is the wavelength of the light emitted by the laser source 110.

In general, in various exemplary embodiments, it is desirable that non of the comparable $Q_0$–$Q_3$ pixels in a set of $Q_0$–$Q_3$ pixels used to determine a measurement value corresponding to a particular location on the object 130 have a unique speckle content. Such a unique speckle content would distort the image intensity value I of the related comparable pixel, and, thus, introduce an error in the related measurement determination. Similarly, in various exemplary embodiments, it is desirable that none of the comparable $Q_0$–$Q_3$ pixels in a set of $Q_0$–$Q_3$ pixels used to determine measurement value corresponding to a particular location on the object 130 correspond to a unique local height on the object 130. Such a unique height would produce a unique nominal phase difference and a unique image intensity value I of the related comparable pixel. As a result, the related measurement determination would not reflect the best estimate of the average height at the particular location on the object 130.

Thus, in various exemplary embodiments, the lateral resolution provided in the image on a detector by the optical input portion 135 is nominally as large or larger than the largest lateral dimension of each complete set of comparable interference portions $Q_0$–$Q_3$ in the multiple phase-shifted interference image information 149 generated using the various exemplary embodiments of the systems and methods according to this invention. That is, in various exemplary embodiments, the lateral spatial averaging provided by the lateral resolution of the optical input portion 135 is nominally equal to or larger than the lateral spatial resolution corresponding to each complete set of comparable interference portions $Q_0$–$Q_3$ in the multiple phase-shifted interference image information 149 generated using the various exemplary embodiments of the systems and methods according to this invention. The lateral resolution indicators 800A, 800B and 800C in FIGS. 12–14 indicate, respectively, for various exemplary embodiments, the approximate exemplary relationship between a set of comparable $Q_0$–$Q_3$ pixels and the lateral resolution provided by the optical input portion 135. In various other exemplary embodiments, a relatively larger lateral resolution is used, and becomes the limiting factor in the lateral spatial resolution of the systems of such embodiments.

In any case, it should be appreciated that, in various exemplary embodiments according to this invention, at least the lateral resolution, the dimensions of the various portions of a high-density polarizer array 330 and/or the various portions of a high-density phase-shifting array element 322 according to this invention, and the pixel size of detector are chosen interdependently, in light of various limiting design factors, costs and the like, to achieve various desirable features and relationships as outlined above.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An interferometer, comprising:
a transmitting portion that directs differently polarized portions of a coherent light beam to a reference element and an object, combines the differently polarized portions returned from the reference element and object into a combined wavefront, and outputs the combined wavefront;
a multiple phase shift image generating portion arranged to input the combined wavefront, the multiple phase shift image generating portion comprising at least a first polarizer array arranged along at least a first optical path, the first polarizer array comprising a plurality of first polarizing portions having a first polarization direction and a plurality of second polarizing portions having a second polarization direction, the first and second polarizing portions arranged in a pattern within the first polarizer array; and
a detector portion comprising at least a first detector array arranged along the first optical path, wherein:
the first polarizer array receives at least a sub-wavefront of the combined wavefront including the differently polarized portions;
the first polarizing portions transmit the differently polarized portions of the sub-wavefront to produce at least first interference portions, the first interference portions comprising interference light having a first unique phase relationship;
the second polarizing portions transmit the differently polarized portions of the sub-wavefront to produce at least second interference portions, the second interference portions comprising interference light having a second unique phase relationship; and
the multiple phase shift image generating portion outputs interleaved multiple phase-shifted interference image information from at least the first polarizer array, the interleaved multiple phase-shifted interference image information from the first polarizer array comprising at least the first interference portions and the second interference portions, at least the first interference portions and the second interference portions interleaved at a spatial frequency determined at least partially by the pattern of the first polarizing portions and the second polarizing portions in the first polarizer array.

2. The interferometer of claim 1, wherein the interleaved multiple phase-shifted interference image information from the first polarizer array is output to form an interleaved image on the first detector array.

3. The interferometer of claim 2, wherein the at least first interference portions and the at least second interference portions each have nominal extents in the interleaved image on the first detector array, and the nominal extents are nominally aligned to coincide with the boundaries of a coextensive set of pixels of the first detector array.

4. The interferometer of claim 3, wherein the coextensive set of pixels on the first detector array is N pixels wide and M pixels high, where M and N are integers.

5. The interferometer of claim 4, wherein M is at most equal to 16 and N is at most equal to 16.

6. The interferometer of claim 5, wherein M at most equal to 8 and N is at most equal to 8.

7. The interferometer of claim 1, wherein the first unique phase relationship corresponds to zero degrees relative phase shift in the corresponding interference light and the second unique phase relationship corresponds to 180 degrees relative phase shift in the corresponding interference light.

8. The interferometer of claim 1, wherein the pattern of the plurality of first polarizing portions and the plurality of second polarizing portions in the first polarizer array comprises a checkerboard pattern.

9. The interferometer of claim 1, wherein the first polarizer array is positioned in proximity to a detector surface of the first detector array.

10. The interferometer of claim 1, wherein the multiple phase shift image generating portion further comprises a first retarder element arranged along the first optical path to receive the sub-wavefront of the combined wavefront including the differently polarized portions and to transmit the sub-wavefront to the first polarizer array.

11. The interferometer of claim 10, wherein the first retarder element comprises at least one of at least one null phase-shift element and at least one quarter wave phase-shift element.

12. The interferometer of claim 11, wherein the first polarizer array is fabricated on a surface of the first retarder element which faces the first detector array and the first polarizer array is positioned in proximity to a detector surface of the first detector array.

13. The interferometer of claim 10, wherein at least the first retarder element, the first polarizer array, and the first detector array form an integrated monolithic phase-shift imaging element.

14. The interferometer of claim 10, wherein:
the first retarder element comprises a first phase-shifting array:
the first phase-shifting array comprises a plurality of first phase-shift portions providing a first phase shift and a plurality of second phase-shift portions providing a second phase shift, the pluralities of the first and second phase shift portions arranged in a pattern within the first phase-shifting array;
the first phase-shifting array is aligned relative the first polarizer array such that each of the first and second polarizing portions are nominally aligned with a single one of the first and second phase-shift portions such that:
for the first polarizing portions that are aligned with the first phase-shift portions, the first polarizing portions transmit the differently polarized portions of the sub-wavefront to produce the first interference portions comprising interference light having the first unique phase relationship;
for the second polarizing portions that are aligned with the first phase-shift portions, the second polarizing portions transmit the differently polarized portions of the sub-wavefront to produce the second interference portions comprising interference light having the second unique phase relationship;
for the first polarizing portions that are aligned with the second phase-shift portions, the first polarizing portions transmit the differently polarized portions of the sub-wavefront to produce a third interference portion comprising interference light having a third unique phase relationship;
for the second polarizing portions that are aligned with the second phase-shift portions, the second polarizing portions transmit the differently polarized portions of the sub-wavefront to produce a fourth interference portion comprising interference light having a fourth unique phase relationship; and
the multiple phase shift image generating portion outputs interleaved multiple phase-shifted interference image information from at least the first polarizer array, the interleaved multiple phase-shifted interference image information from the first polarizer array comprising the first, second, third and fourth interference portions, the first, second, third and fourth interference portions interleaved at a spatial frequency determined at least partially by the pattern of the first polarizing portions and the second polarizing portions in the first polarizer array in combination with the pattern of the plurality of first phase shift portions and the plurality of second phase-shift portions in the first phase-shifting array.

15. The interferometer of claim 14, wherein:
the pattern of the plurality of first polarizing portions and the plurality of second polarizing portions in the first polarizer array comprises a striped polarization pattern;
the pattern of the plurality of first phase shift portions and the plurality of second phase-shift portions in the first phase-shifting array comprises a striped retarder pattern; and the striped retarder pattern is nominally orthogonal to the striped polarization pattern.

16. The interferometer of claim 14, wherein the pattern of the plurality of first polarizing portions and the plurality of second polarizing portions in the first polarizer array comprises a checkerboard polarization pattern and the pattern of the plurality of first phase shift portions and the plurality of second phase-shift portions in the first phase-shifting array comprises a striped retarder pattern.

17. The interferometer of claim 14, wherein the pattern of the plurality of first polarizing portions and the plurality of second polarizing portions in the first polarizer array comprises a checkerboard polarization pattern and the pattern of the plurality of first phase shift portions and the plurality of second phase-shift portions in the first phase-shifting array comprises a checkerboard retarder pattern that is coarser than the checkerboard polarization pattern.

18. The interferometer of claim 14, wherein the plurality of first phase-shift portions comprise a plurality of null phase-shift portions and the plurality of second phase-shift portions comprise a plurality of quarter wave phase-shift portions.

19. The interferometer of claim 14, wherein the first unique phase relationship corresponds to zero degrees relative phase shift in the corresponding interference light, the second unique phase relationship corresponds to 180 degrees relative phase shift in the corresponding interference light, the third unique phase relationship corresponds to 90 degrees relative phase shift in the corresponding interference light, and the fourth unique phase relationship corresponds to 270 degrees relative phase shift in the corresponding interference light.

20. The interferometer of claim 1, wherein:
the multiple phase shift image generating portion further comprises:
a beam-splitting surface,
a first retarder element useable to provide at least a first phase shift,
a second retarder element useable to provide at least a second phase shift, and
a second polarizer array arranged along a second optical path, the second polarizer array comprising a plurality of first polarizing portions having the first polarization direction and a plurality of second polarizing portions having the second polarization direction, the first and second polarizing portions arranged in a pattern within the second polarizer array;
the detector portion further comprises a second detector array arranged along the second optical path,
the beam-splitting surface is arranged to receive the combined wavefront and to transmit a first sub-wavefront of the combined wavefront including the differently polarized portions along the first optical path and a second sub-wavefront of the combined wavefront including the differently polarized portions along the second optical path;
the first retarder element is arranged along the first optical path to receive the first sub-wavefront and transmit the first sub-wavefront to the first polarizer array;
the second retarder element is arranged along the second optical path to receive the second sub-wavefront and transmit the second sub-wavefront to the second polarizer array;
the first polarizing portions of the first polarizer array transmit the differently polarized portions of the first sub-wavefront to produce at least the first interference portions that comprises the interference light having the first unique phase relationship;

the second polarizing portions of the first polarizer array transmit the differently polarized portions of the first sub-wavefront to produce at least the second interference portions that comprises the interference light having the second unique phase relationship;

the first polarizing portions of the second polarizer array transmit the differently polarized portions of the second sub-wavefront to produce at least third interference portions, the third interference portions comprising interference light having a third unique phase relationship;

the second polarizing portions of the second polarizer array transmit the differently polarized portions of the second sub-wavefront to produce at least fourth interference portions, the fourth interference portions comprising interference light having a fourth unique phase relationship; and the multiple phase shift image generating portion further outputs interleaved multiple phase-shifted interference image information from the second polarizer array, the interleaved multiple phase-shifted interference image information from the second polarizer array comprising the at least third interference portions and the at least fourth interference portions, the at least third interference portions and the at least fourth interference portions interleaved at a spatial frequency determined at least partially by the pattern of the first polarizing portions and the second polarizing portions in the second polarizer array.

21. The interferometer of claim 20, wherein:

the interleaved multiple phase-shifted interference image information from the first polarizer array is output to form a first interleaved image on the first detector array;

the interleaved multiple phase-shifted interference image information from the second polarizer array is output to form a second interleaved image on the second detector array; and the second interleaved image corresponds to the first interleaved image.

22. The interferometer of claim 21, wherein the first, second, third and fourth interference portions each have nominal extents in corresponding interleaved images on the corresponding detector arrays, and the nominal extents are nominally aligned to coincide with the boundaries of coextensive sets of pixels of the corresponding detector arrays, and the coextensive set of pixels are each N pixels wide and M pixels high, where M and N are integers at most equal to 16.

23. The interferometer of claim 20, wherein the first unique phase relationship corresponds to zero degrees relative phase shift in the corresponding interference light, the second unique phase relationship corresponds to 180 degrees relative phase shift in the corresponding interference light, the third unique phase relationship corresponds to 90 degrees relative phase shift in the corresponding interference light, and the fourth unique phase relationship corresponds to 270 degrees relative phase shift in the corresponding interference light.

24. The interferometer of claim 20, wherein:

the first retarder element comprises a null phase-shift element; and the second retarder element comprises a quarter wave phase-shift element.

25. The interferometer of claim 24, wherein:

the pattern of the plurality of first polarizing portions and the plurality of second polarizing portions in the first polarizer array comprises a checkerboard pattern; and the pattern of the plurality of first polarizing portions and the plurality of second polarizing portions in the second polarizer array comprises a similar checkerboard pattern.

26. The interferometer of claim 20, wherein:

the multiple phase shift image generating portion further comprises a first reflective surface and a second reflective surface;

the first reflective surface is arranged to receive the first sub-wavefront from the beam splitting surface and reflect the first sub-wavefront along a portion of the first optical path that extends along a first direction;

the second reflective surface is arranged to receive the second sub-wavefront from the beam splitting surface and reflect the second sub-wavefront along a portion of the second optical path that is parallel to the first direction;

the first retarder element and the second retarder element are nominally coplanar;

the first polarizer array and the second polarizer array are nominally coplanar; and the first detector array and the second detector array are nominally coplanar.

27. The interferometer of claim 26, wherein at least one of a) the set of the first retarder element and the second retarder element, b) the set of the first polarizer array and the second polarizer array, and c) the set of the first detector array and the second detector array comprise first and second portions of the same element.

28. The interferometer of claim 20, wherein at least the elements of the multiple phase shift image generating portion and the first detector array form an integrated phase-shift imaging element.

29. The interferometer of claim 1, wherein the plurality of first polarizing portions and the plurality of second polarizing portions comprise wire-grid polarizers.

30. A method for determining a distance using an interferometer, comprising:

directing differently polarized portions of a coherent light beam to a reference element and an object;

combining the differently polarized portions returned from the reference element and object into a combined wavefront;

passing the combined wavefront through at least a first polarizer array arranged along at least a first optical path, the first polarizer array comprising a plurality of first polarizing portions having a first polarization direction and a plurality of second polarizing portions having a second polarization direction, the first and second polarizing portions arranged in a pattern within the first polarizer array, to produce interleaved multiple phase-shifted interference image information, comprising:

receiving at the first polarizer array at least a sub-wavefront of the combined wavefront including the differently polarized portions, transmitting through the first polarizing portions the differently polarized portions of the sub-wavefront to produce at least first interference portions, the first interference portions comprising interference light having a first unique phase relationship, transmitting through the second polarizing portions the differently polarized portions of the sub-wavefront to produce at least second interference portions, the second interference portions comprising interference light having a second unique phase relationship; and directing the interleaved multiple phase-shifted interference image information from at least the first polarizer array to a detector portion comprising at least a first detector array arranged along the first optical path;

wherein the interleaved multiple phase-shifted interference image information comprises at least the first interference portions and the at least second interference portions interleaved at a spatial frequency determined at least partially by the pattern of the first polarizing portions and the second polarizing portions in the first polarizer array.

31. The method of claim 30, wherein directing the interleaved multiple phase-shifted interference image information from at least the polarizer array to a detector portion comprises forming an interleaved image on the first detector array.

32. The method of claim 31, wherein:

the at least first interference portions and the at least second interference portions each have nominal extents in the interleaved image on the first detector array; and forming the interleaved image on the first detector array comprises projecting at least the interleaved first and second interference portions onto the first detector array such that the nominal extents nominally coincide with the boundaries of a coextensive set of pixels of the first detector array.

33. The method of claim 32, wherein the coextensive set of pixels on the first detector array is N pixels wide and M pixels high, where M and N are integers and M is at most equal to 16 and N is at most equal to 16.

34. The method of claim 30, wherein the pattern of the plurality of first polarizing portions and the plurality of second polarizing portions in the first polarizer array comprises a checkerboard pattern.

35. The method of claim 30, wherein:

the multiple phase shift image generating portion further comprises a first retarder element arranged along the first optical path;

passing the combined wavefront through at least a first polarizer array arranged along at least the first optical path further comprises:

receiving at the first retarder element the sub-wavefront of the combined wavefront including the differently polarized portions, and transmitting the sub-wavefront to the first polarizer array and receiving at the first polarizer array at least the sub-wavefront of the combined wavefront comprises receiving the sub-wavefront transmitted from the retarder element.

36. The method of claim 35, wherein the first retarder element comprises at least one of at least one null phase-shift element and at least one quarter wave phase-shift element.

37. The method of claim 35, wherein:

the first retarder element comprises a first phase-shifting array that comprises a plurality of first phase-shift portions providing a first phase shift and a plurality of second phase-shift portions providing a second phase shift, the pluralities of the first and second phase shift portions arranged in a pattern within the first phase-shifting array;

the first phase-shifting array is aligned relative the first polarizer array such that each of the first and second polarizing portions are nominally aligned with a single one of the first and second phase-shift portions; and transmitting through the first polarizing portions the differently polarized portions of the sub-wavefront comprises:

transmitting the differently polarized portions of the sub-wavefront through the first phase-shift portions and the first polarizing portions that are aligned with the first phase-shift portions to produce the first interference portions comprising interference light having the first unique phase relationship, and transmitting the differently polarized portions of the sub-wavefront through the second phase-shift portions and the first polarizing portions that are aligned with the second phase-shift portions to produce a third interference portions comprising interference light having a third unique phase relationship;

transmitting through the second polarizing portions the differently polarized portions of the sub-wavefront comprises:

transmitting the differently polarized portions of the sub-wavefront through the first phase-shift portions and the second polarizing portions that are aligned with the first phase-shift portions to produce the second interference portions comprising interference light having the second unique phase relationship, and transmitting the differently polarized portions of the sub-wavefront through the second phase-shift portions and the second polarizing portions that are aligned with the second phase-shift portions to produce a fourth interference portions comprising interference light having a fourth unique phase relationship; and directing the interleaved multiple phase-shifted interference image information from at least the first polarizer array to the detector portion comprises directing the first, second, third and fourth interference portions to the detector portion; wherein at least the first, second, third and fourth interference portions are interleaved at a spatial frequency determined at least partially by the pattern of the first polarizing portions and the second polarizing portions in the first polarizer array in combination with the pattern of the plurality of first phase shift portions and the plurality of second phase-shift portions in the first phase-shifting array.

38. The method of claim 37, wherein the first unique phase relationship corresponds to zero degrees relative phase shift in the corresponding interference light, the second unique phase relationship corresponds to 180 degrees relative phase shift in the corresponding interference light, the third unique phase relationship corresponds to 90 degrees relative phase shift in the corresponding interference light, and the fourth unique phase relationship corresponds to 270 degrees relative phase shift in the corresponding interference light.

39. A method for determining a distance using an interferometer, comprising:

directing differently polarized portions of a coherent light beam to a reference element and an object;

combining the differently polarized portions returned from the reference element and object into a combined wavefront;

splitting the combined wavefronts into at least a first sub-wavefront of the combined wavefront including the differently polarized portions and a second sub-wavefront of the combined wavefront including the differently polarized portions;

directing the first sub-wavefront along a first optical path to a first retarder element;

directing the second sub-wavefront along a second optical path to a second retarder element;

passing the first sub-wavefront through the first retarder element and a first polarizer array to produce first interleaved multiple phase-shifted interference image information, wherein:
  the first retarder element provides at least a first phase shift, and
  the first polarizer array comprises a plurality of first polarizing portions having a first polarization direction and a plurality of second polarizing portions having a second polarization direction, the first and second polarizing portions arranged in a pattern within the first polarizer array,
comprising:
  receiving at the first polarizer array the first sub-wavefront of the combined wavefront including the differently polarized portions having the first phase shift,
  transmitting through the first polarizing portions the differently polarized portions having the first phase-shift of the first sub-wavefront to produce at least first interference portions comprising interference light having a first unique phase relationship, and
  transmitting through the second polarizing portions the differently polarized portions having the first phase shift of the first sub-wavefront to produce at least second interference portions comprising interference light having a second unique phase relationship;

passing the second sub-wavefront through the second retarder element and a second polarizer array to produce second interleaved multiple phase-shifted interference image information, wherein:
  the second retarder element provides at least a second phase shift, and
  the second polarizer array comprising a plurality of first polarizing portions having the first polarization direction and a plurality of second polarizing portions having the second polarization direction, the first and second polarizing portions arranged in a pattern within the second polarizer array,
comprising:
  receiving at the second polarizer array the second sub-wavefront of the combined wavefront including the differently polarized portions having the second phase shift,
  transmitting through the first polarizing portions the differently polarized portions having the second phase-shift of the second sub-wavefront to produce at least third interference portions comprising interference light having a third unique phase relationship, and
  transmitting through the second polarizing portions the differently polarized portions having the second phase shift of the second sub-wavefront to produce at least fourth interference portions comprising interference light having a fourth unique phase relationship;

directing the first interleaved multiple phase-shifted interference image information onto a first detector array; and directing the second interleaved multiple phase-shifted interference image information onto a second detector array;

wherein:
  the first interleaved multiple phase-shifted interference image information comprises at least the first interference portions and the second interference portions interleaved at a spatial frequency determined at least partially by the pattern of the first polarizing portions and the second polarizing portions in the first polarizer array; and
  the second interleaved multiple phase-shifted interference image information comprises at least the third interference portions and the fourth interference portions interleaved at a spatial frequency determined at least partially by the pattern of the first polarizing portions and the second polarizing portions in the second polarizer array.

40. The method of claim 39, wherein:
directing the first interleaved multiple phase-shifted interference image information onto the first detector array comprises forming a first interleaved image on the first detector array;
directing the second interleaved multiple phase-shifted interference image information onto the second detector array comprises forming a second interleaved image on the second detector array; and
the second interleaved image corresponds to the first interleaved image.

41. The method of claim 40, wherein:
the at least first interference portions and the at least second interference portions each have nominal extents in the first interleaved image on the first detector array;
the at least third interference portions and the at least fourth interference portions each have nominal extents in the second interleaved image on the second detector array;
forming the first interleaved image on the first detector array comprises projecting at least the interleaved first and second interference portions onto the first detector array such that the nominal extents nominally coincide with the boundaries of a coextensive set of pixels of the first detector array;
forming the second interleaved image on the second detector array comprises projecting at least the interleaved third and fourth interference portions onto the second detector array such that the nominal extents nominally coincide with the boundaries of a coextensive set of pixels of the second detector array and
the coextensive set of pixels are each N pixels wide and M pixels high, where M and N are integers at most equal to 16.

42. The method of claim 39, wherein the first unique phase relationship corresponds to zero degrees relative phase shift in the corresponding interference light, the second unique phase relationship corresponds to 180 degrees relative phase shift in the corresponding interference light, the third unique phase relationship corresponds to 90 degrees relative phase shift in the corresponding interference light, and the fourth unique phase relationship corresponds to 270 degrees relative phase shift in the corresponding interference light.

43. The method of claim 39, wherein:
the first retarder element comprises a null phase-shift element; and
the second retarder element comprises a quarter wave phase-shift element.

44. The method of claim 43, wherein:
the pattern of the plurality of first polarizing portions and the plurality of second polarizing portions in the first polarizer array comprises a checkerboard pattern; and
the pattern of the plurality of first polarizing portions and the plurality of second polarizing portions in the second polarizer array comprises a similar checkerboard pattern.

45. The method of claim 39, wherein:
directing the first sub-wavefront along the first optical path to the first retarder element comprises:
  directing the first sub-wavefront to a first reflective surface, and
  directing the first sub-wavefront from the first reflective surface to the first retarder element along a portion of the first optical path that extends along a first direction;
directing the second sub-wavefront along the second optical path to the second retarder element comprises:
  directing the second sub-wavefront to a second reflective surface, and
  directing the second sub-wavefront from the second reflective surface to the second retarder element along a portion of the second optical path that that is parallel to the first direction; wherein:
the first retarder element and the second retarder element are nominally coplanar;
the first polarizer array and the second polarizer array are nominally coplanar; and
the first detector array and the second detector array are nominally coplanar.

* * * * *